US012711460B2

(12) United States Patent
Helvik

(10) Patent No.: US 12,711,460 B2
(45) Date of Patent: Aug. 18, 2026

(54) ASSISTANT FOR PROVIDING INFORMATION ON UNKNOWN TOPICS

(71) Applicant: Microsoft Technology Licensing, LLC, Redmond, WA (US)

(72) Inventor: Torbjørn Helvik, Oslo (NO)

(73) Assignee: Microsoft Technology Licensing, LLC, Redmond, WA (US)

( * ) Notice: Subject to any disclaimer, the term of this patent is extended or adjusted under 35 U.S.C. 154(b) by 269 days.

(21) Appl. No.: 18/532,771

(22) Filed: Dec. 7, 2023

(65) Prior Publication Data

US 2024/0111958 A1 Apr. 4, 2024

Related U.S. Application Data

(63) Continuation of application No. 17/364,342, filed on Jun. 30, 2021, now Pat. No. 11,880,663.

(51) Int. Cl.

| | |
|---|---|
| ***G06F 17/00*** | (2019.01) |
| ***G06F 40/30*** | (2020.01) |
| ***G10L 15/26*** | (2006.01) |
| ***H04L 51/046*** | (2022.01) |

(52) U.S. Cl.
CPC .............. *G06F 40/30* (2020.01); *G10L 15/26* (2013.01); *H04L 51/046* (2013.01)

(58) Field of Classification Search
None
See application file for complete search history.

(56) References Cited

U.S. PATENT DOCUMENTS

| | | | | |
|---|---|---|---|---|
| 9,450,771 | B2 * | 9/2016 | Browning | H04L 67/52 |
| 9,483,532 | B1 * | 11/2016 | Zhang | G06F 16/24553 |
| 10,733,903 | B2 * | 8/2020 | Kurowski | G16H 20/60 |
| 11,080,490 | B2 * | 8/2021 | Koohmarey | G06N 3/006 |
| 11,102,304 | B1 * | 8/2021 | Jain | H04L 67/12 |
| 2012/0089395 | A1 * | 4/2012 | Chavez | G10L 15/26 704/235 |
| 2016/0292583 | A1 * | 10/2016 | Browning | G06N 5/048 |
| 2016/0371709 | A1 * | 12/2016 | Browning | G06N 5/048 |
| 2018/0047395 | A1 * | 2/2018 | Sommers | G06F 40/169 |
| 2020/0004890 | A1 * | 1/2020 | Myhre | G06F 40/30 |
| 2020/0043479 | A1 * | 2/2020 | Mont-Reynaud | G06F 40/58 |

* cited by examiner

*Primary Examiner* — Satwant K Singh

(57) ABSTRACT

Techniques are disclosed for assisting users with unknown topics by automatically presenting information associated with the unknown topics to the users. In an example embodiment, an unknown topic is referred to or discussed during a conversation between multiple users. A candidate definition for the topic is determined, where the candidate definition is known by the user that used the topic. Based on a determination that the topic and the candidate definition are unknown to a second user in the conversation, the topic and the candidate definition are provided to one or more output devices for presentation to the second user.

20 Claims, 17 Drawing Sheets

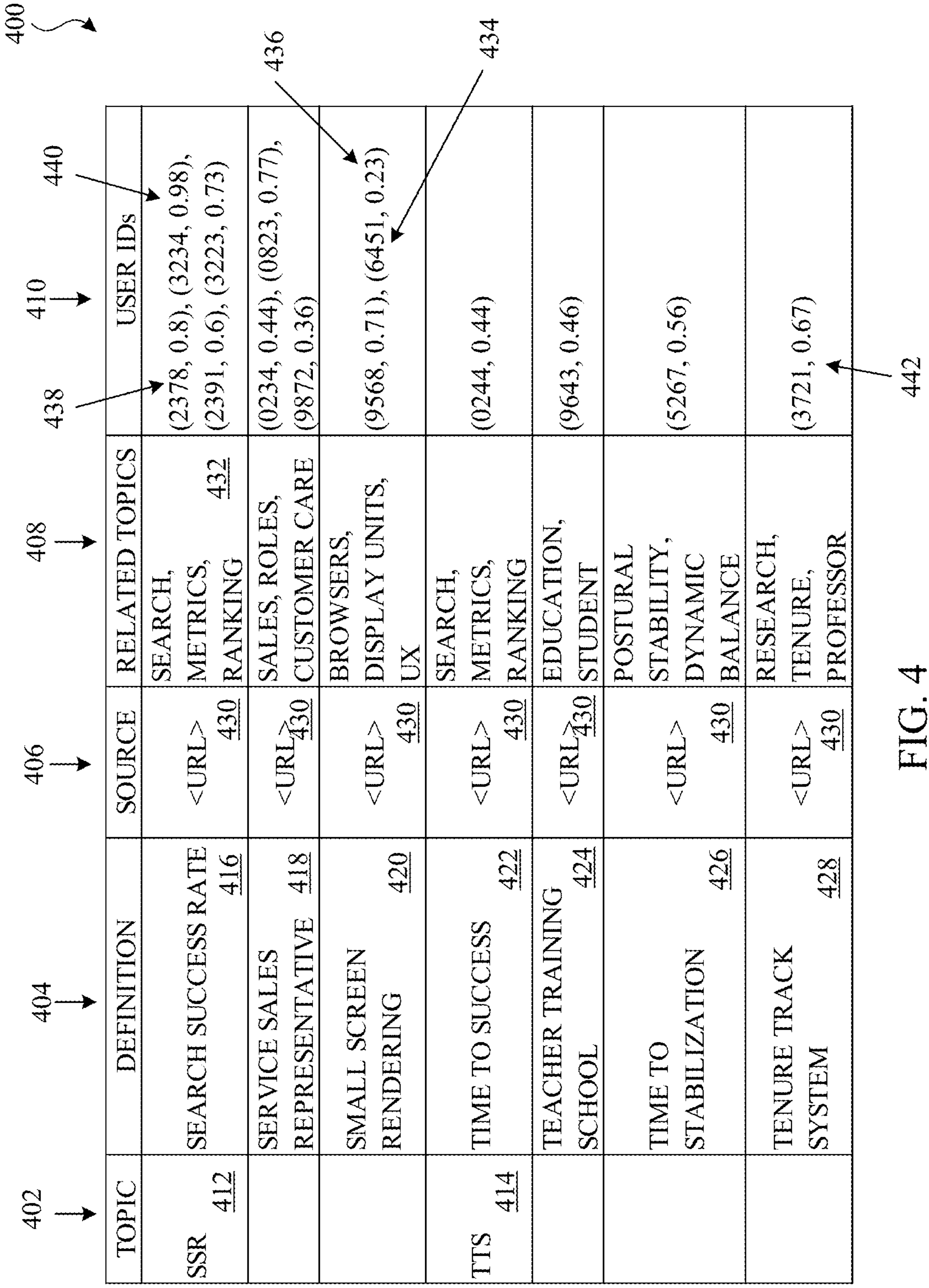

| TOPIC | DEFINITION | SOURCE | RELATED TOPICS | USER IDs |
|---|---|---|---|---|
| SSR 412 | SEARCH SUCCESS RATE 416 | <URL> 430 | SEARCH, METRICS, RANKING 432 | (2378, 0.8), (3234, 0.98), (2391, 0.6), (3223, 0.73) |
| | SERVICE SALES REPRESENTATIVE 418 | <URL> 430 | SALES, ROLES, CUSTOMER CARE | (0234, 0.44), (0823, 0.77), (9872, 0.36) |
| | SMALL SCREEN RENDERING 420 | <URL> 430 | BROWSERS, DISPLAY UNITS, UX | (9568, 0.71), (6451, 0.23) |
| TTS 414 | TIME TO SUCCESS 422 | <URL> 430 | SEARCH, METRICS, RANKING | (0244, 0.44) |
| | TEACHER TRAINING SCHOOL 424 | <URL> 430 | EDUCATION, STUDENT | (9643, 0.46) |
| | TIME TO STABILIZATION 426 | <URL> 430 | POSTURAL STABILITY, DYNAMIC BALANCE | (5267, 0.56) |
| | TENURE TRACK SYSTEM 428 | <URL> 430 | RESEARCH, TENURE, PROFESSOR | (3721, 0.67) |

FIG. 4

ASSISTANT FOR PROVIDING INFORMATION ON UNKNOWN TOPICS

CROSS-REFERENCE TO RELATED APPLICATIONS

This application is a continuation of U.S. patent application Ser. No. 17/364,342 filed Jun. 30, 2021, entitled "Assistant For Providing Information on Unknown Topics," which is incorporated herein by reference in its entirety.

BACKGROUND

People regularly attend or participate in conversations throughout a day. This can be especially true at an enterprise, such as a business, a university, or an organization. The conversations can be in-person or online meetings, online chats, presentations, seminars, and the like. In some instances, a first person in the conversation uses or refers to a topic that is unknown to a second person in the conversation. The second user may not be able to search for the topic quickly without losing track of the conversation. Also, in an effort to avoid disrupting the conversation, the second user may not ask for an explanation of the topic during the conversation.

SUMMARY

Embodiments disclosed herein provide techniques for assisting users with unknown topics by automatically presenting information associated with the unknown topics to the users. In one aspect, a method includes detecting a use of a topic in a conversation between multiple users, such as a first user and a second user, where the first user uses the topic in the conversation. One or more candidate definitions of the topic as known by the first user are determined. The topic and at least one candidate definition are determined to be unknown to the second user. At least one of the one or more candidate definitions of the topic are determined to be presented to the second user and are provided to one or more output devices for presentation to the second user. The output device can be any suitable output device, such as a display, a speaker, a mobile telephone, a tablet, a television, and a projector.

In another aspect, a system includes a processing device and a storage device operably connected to the processing device. The storage device stores instructions, that when executed by the processing device, cause operations to be performed. The operations include detecting a use of a topic in a conversation between multiple users, such as a first user and a second user, where the first user uses the topic in the conversation. One or more candidate definitions of the topic as known by the first user are determined. A determination is made that the topic and at least one candidate definition are unknown to the second user. At least one of the one or more candidate definitions of the topic are determined to be presented to the second user and are provided to one or more output devices for presentation to the second user.

In yet another aspect, a method includes detecting a use of a topic in a meeting between multiple users, such as a first user and a second user, where the first user speaks the topic in the online meeting. A plurality of candidate definitions of the topic that is known by the first user is determined. A determination is made that the topic and the plurality of candidate definitions are unknown to the second user. One or more of the plurality of candidate definitions of the topic are determined to be presented to the second user. At least one of the one or more candidate definitions are caused to be provided to an output device. For example, when the meeting is an online meeting, the at least one candidate definition is displayed in a graphical user interface of the online meeting.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures. The elements of the drawings are not necessarily to scale relative to each other. Identical reference numerals have been used, where possible, to designate identical features that are common to the figures.

FIG. 4 illustrates an example global list of known topics, information associated with the topics, users, and confidence scores in accordance with some embodiments;

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems, or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Generally, embodiments disclosed herein provide techniques for assisting users with unknown topics by automatically presenting information associated with the unknown topics to the users. In an example embodiment, an unknown topic is referred to or discussed during a conversation between multiple users. Example conversations include, but are not limited to, online meetings, online chats, presentations, seminars, and in-person meetings. An assistant application determines a meaning or information associated with the topic as known by the person (a first user) who used or referred to the topic, and then determines whether a person (a second user) who heard or read the topic during the conversation knows the topic and a candidate definition or information associated with the topic. If a determination is made that the second user does not know the topic and the candidate definition, the assistant application determines or retrieves information for the second user and provides the information to one or more output devices for presentation to the second user. In some embodiments, the assistant application causes the information to be provided to the output device(s).

Technical advantages of the disclosed embodiments include providing targeted or personalized assistance to a user when the user is unfamiliar with a topic. The user is not provided with information when the user already knows of the topic. Additionally or alternatively, the personalized information can be determined, retrieved, and presented to the user automatically without user input or action in a timely manner. In some instances, the information is provided to the user in substantially real-time, for example, while a discussion of a topic that is associated with the information occurs.

Figure 1:
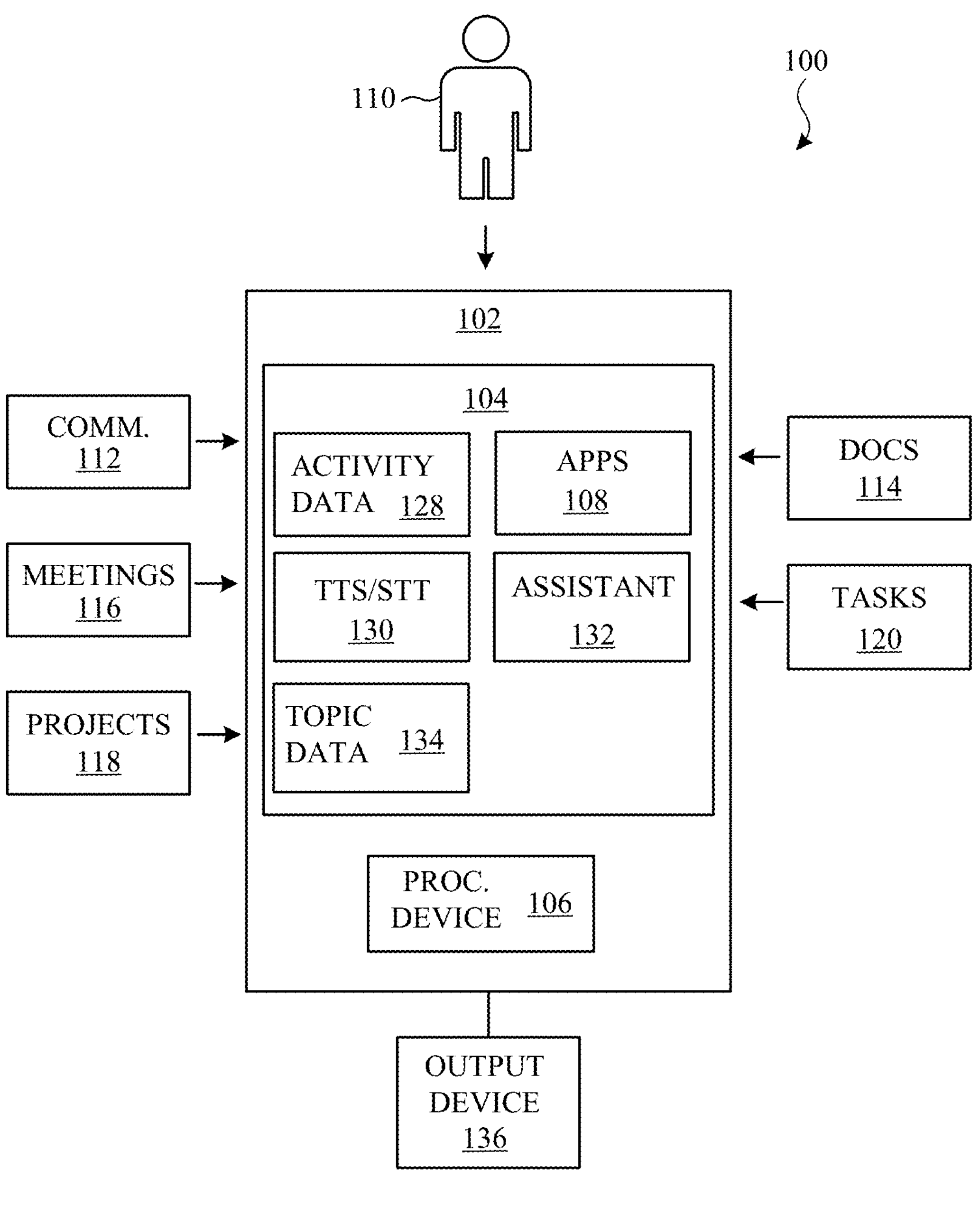
FIG. 1 illustrates a block diagram of a first system in which aspects of the present disclosure may be practiced.

FIG. 1 illustrates a block diagram of a first system in which aspects of the present disclosure may be practiced. The system 100 includes a computing device 102 that includes one or more storage devices (collectively referred to as storage device 104) and one or more processing devices (collectively referred to as processing device 106). The storage device 104 stores computer-executable instructions or one or more software applications 108. A user 110 interacts with the software application(s) to perform various activities. The activities can include sending, receiving, redirecting, creating, modifying, deleting, and viewing electronic communications 112. Example electronic communications include, but are not limited to, emails, text messages, instant messages, online chats, video messages, audio messages, and posts in social media.

The activities may further include creating, deleting, viewing, and/or editing documents 114, and organizing and/or attending in person and online meetings 116. Other activities can include working on, or managing one or more projects 118 and setting, modifying, deleting, monitoring, and/or completing tasks 120. Some of the tasks 120 may be related to or in advancement of the project(s) 118, while other tasks can be related to other business or personal activities.

These activities by the user 110 create, delete, and modify activity data 128 that is stored on the storage device 104. The activity data 128 includes data such as emails, various types of documents, meetings and other calendar information, contacts (people), text messages, and the like. In some embodiments, the activity data 128 also includes the activity data for multiple users, such as the users in an enterprise. An enterprise includes, but is not limited to, a company, an organization, a university, an association, an institution, or other establishment.

A text-to-speech (TTS) and speech-to-text (STT) application 130 is stored on the storage device 104. The TTS application is operable to convert text into speech (an audio output). The STT application is operable to recognize and convert speech (an audio input) into text.

An assistant application 132 is stored on the storage device 104 and is operable to detect one or more topics in the audio input, the text converted from the audio input and/or the text output. The assistant application 132 is also operable to analyze the activity data 128 to identify topics. The topics can include, but are not limited to, acronyms, abbreviations, codenames, tools, teams, project names, and organizational units. In some embodiments, the topics are associated with an enterprise.

In one embodiment, a global list of known topics is stored in the topic data 134. The global list of known topics can be associated with multiple users, such as the users in an enterprise. As will be described in more detail later, the assistant application 132 is operable to access the global list to determine whether the user 110 is unfamiliar with (or does not know of) a topic. When the topic is unknown to the user 110, the assistant application 132 determines which information associated with the topic will be presented to the user 110. The assistant application 132 provides the information for presentation (or causes the information to be provided for presentation). In some instances, the assistant application 132 updates the global list with new topics and/or information in real-time, in substantially real-time, at regular intervals, at selected times, or on demand.

In some embodiments, the assistant application 132 includes one or more machine learning mechanisms (e.g., models, algorithms, or applications) that are operable to perform one or more text-mining and/or data-mining mechanisms (e.g., model, algorithm, application). Generally, the text-mining and/or data mining mechanism(s) uses natural language processing to extract the topics and information from the activity data and the text that corresponds to the text or audio input. The machine learning mechanism(s) is adaptable over time such that the assistant application 132 learns and becomes more efficient and effective at detecting topics, determining which topics are known and unknown to the users, and determining which information is likely to be the information that is relevant to a particular user when providing the information to that user. The machine learning mechanism(s) learns over time based on the user's 110 interactions with the presentation of the information, the user's 110 adjustments to the information, new information the user 110 accesses or interacts with, and other types of user interactions.

A topic and at least some of the information associated with the topic are provided to one or more output devices (collective referred to as output device 136). The output device 136 can be included in the computing device 102 or may be operably connected to the computing device 102. An example output device 136 includes, but is not limited to, a display device, a speaker (e.g., in combination with TTS application 130), a printer, and a display screen included or operably connected to a second computing device (e.g., a tablet, a mobile phone).

In a non-limiting nonexclusive example, the user 110 is attending a meeting using a collaborative software application, such as MICROSOFT TEAMS. During the meeting, a participant in the meeting mentions an acronym. Since the STT application 130 is converting the audio input into text in substantially real-time, the assistant application 132 detects the acronym in the text and accesses the topic data 134 to determine if the acronym is unknown to the user 110. The assistant application 132 determines one or more meanings of the acronym and provides the one or more meanings to the output device 136 for presentation in the graphical user interface (GUI) of MICROSOFT TEAMS.

The computing device 102 can be any suitable type of computing device. Example computing devices include a laptop computer, a tablet, a mobile telephone, a smart phone, a smart watch, a wearable computer, a desktop computer, a gaming device/computer (e.g., Xbox), a television, or a server computing device. These example computing devices are for example purposes only and should not be considered as limiting.

Figure 2:
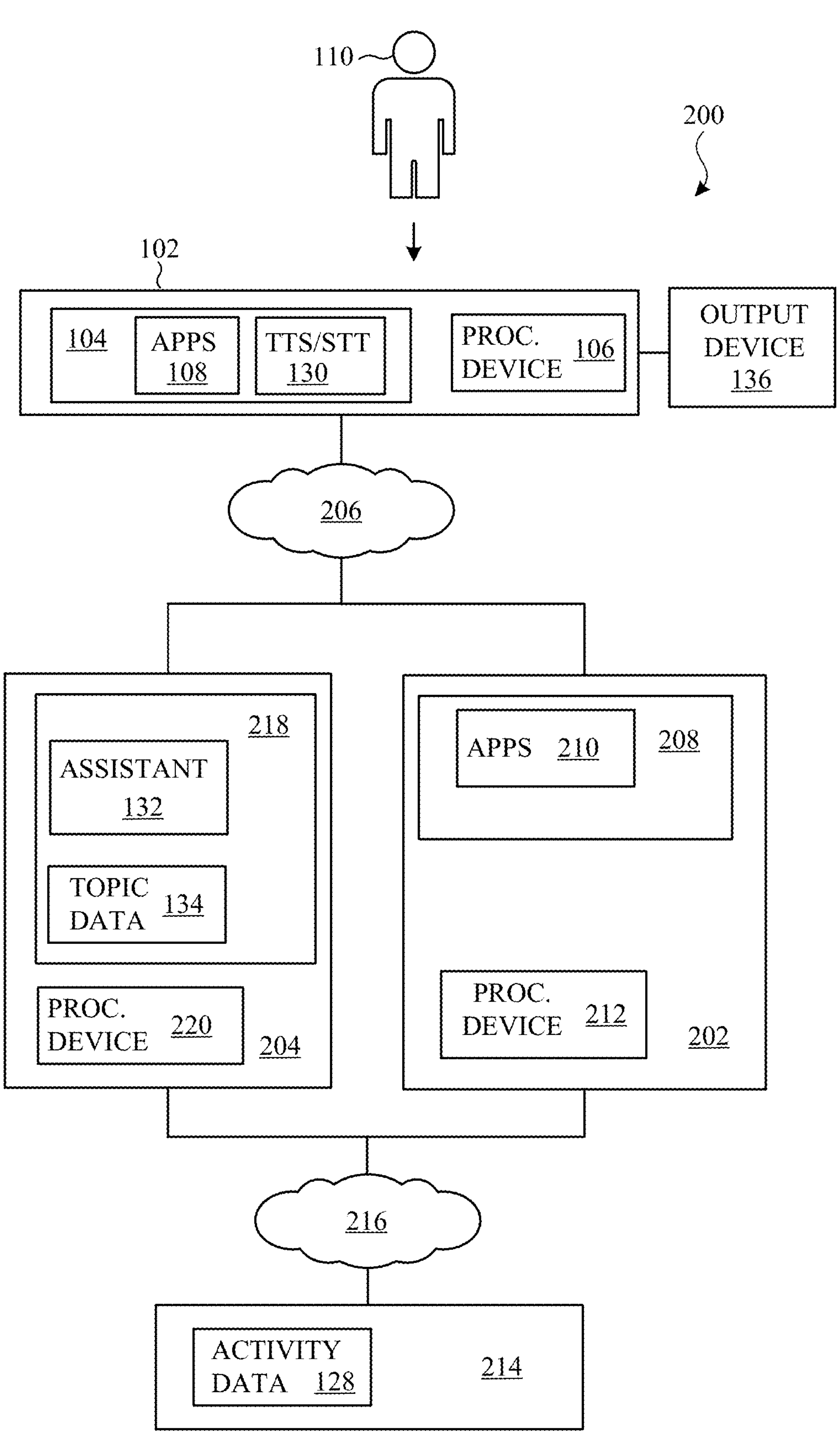
FIG. 2 illustrates a block diagram of a second system in which aspects of the present disclosure may be practiced.

FIG. 2 illustrates a block diagram of a second system in which aspects of the present disclosure may be practiced. The system 200 is a distributed system that includes the computing device 102, a second computing device 202, and a third computing device 204. The second and the third computing devices 202, 204 are each operably connected to the computing device 102 through one or more networks (collectively network 206).

The second computing device 202 includes one or more storage devices (collectively storage device 208) that stores one or more applications 210. The application(s) 210 can be at least one of the applications 108, or the application(s) 210 can differ from the applications 108. One or more processing devices (collectively processing device 212) are operable to execute the application(s) 210. The user 110 interacts with the applications 108, 210 to create activity data 128. One or more storage devices (storage device 214) are operably connected to the second computing device 202 and the third computing device 204 through one or more networks (collectively network 216). The storage device 214 stores the activity data 128.

The third computing device 204 includes one or more storage devices (collectively storage device 218) that stores the assistant application 132 and the topic data 134. One or more processing devices (collectively processing device 220) are operable to execute the assistant application 132. When executed by the processing device 220, the assistant application 132 can receive TTS and/or STT data through the network 206 to detect one or more topics. The assistant application 132 may also access the activity data 128 through the network 216 to analyze the activity data and detect one or more topics. When one or more topics are detected, the assistant application 132 determines if the topic(s) is unknown to the user 110, and if so, accesses the topic data 134 to retrieve information associated with the topic(s) to provide to the user 110. In one embodiment, the information retrieved by the assistant application 132 is information that is likely or expected to be relevant to (e.g., assist) the user 110 in understanding the topic(s) or context of the topic(s).

Networks 206, 216 are illustrative of any suitable type of network, for example, an intranet, and/or a distributed computing network (e.g., the Internet) over which the computing devices 102, 202, 204 may communicate with each other and with the storage devices 214. Additionally, the computing devices 202, 204 can each be any suitable computing device, such as a mobile telephone, a smart phone, a tablet, a smart watch, a wearable computer, a personal computer a desktop computer, a laptop computer, a gaming device/computer (e.g., Xbox), a television, or a server computing device. Although FIG. 2 depicts three computing devices 102, 202, 204 and one storage device 214, other embodiments are not limited to this configuration. The system 200 can include any suitable number of computing devices and/or storage devices.

Figure 3:
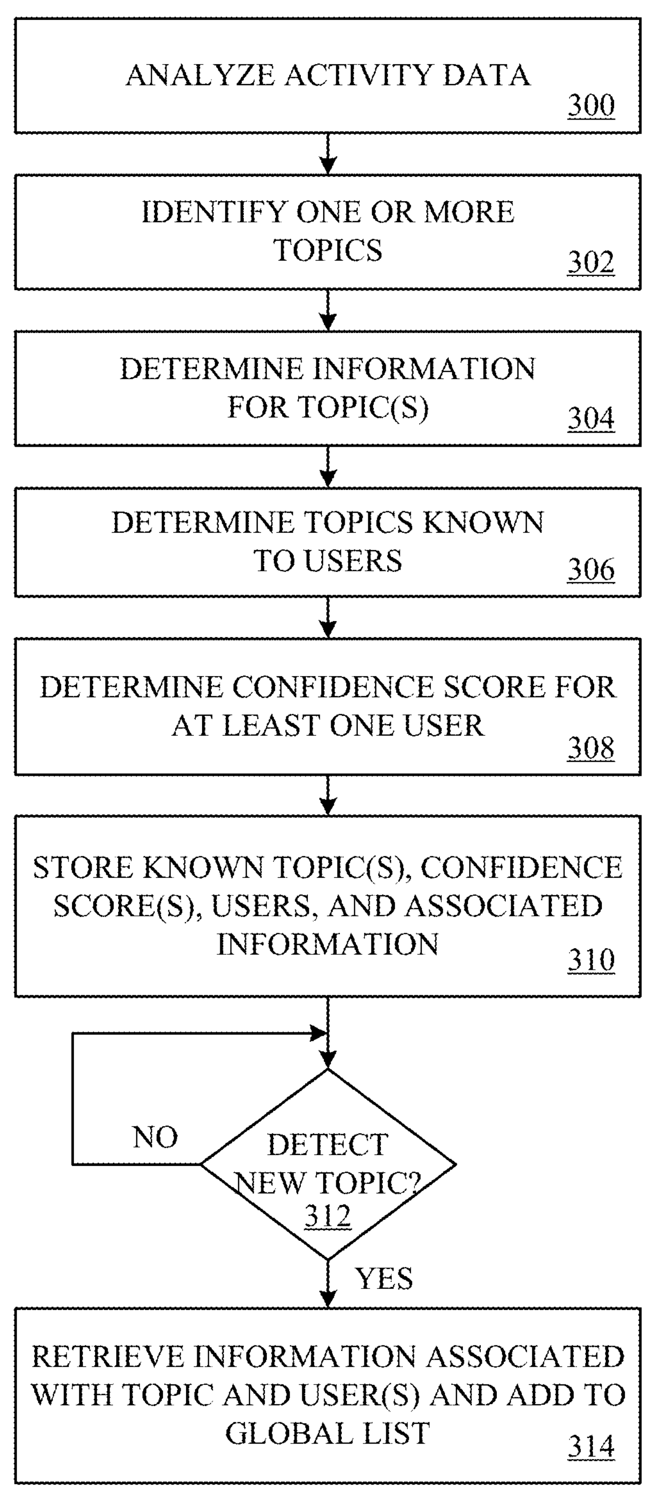
FIG. 3 illustrates a flowchart of a method of generating known topics in accordance with some embodiments.

FIG. 3 illustrates a flowchart of a method of generating known topics in accordance with some embodiments. The representative method produces a global list of known topics for multiple users, such as the users in an enterprise. In some embodiments, the global list can also include information that is associated with the known topics. As noted earlier, a topic can include, but is not limited to, acronyms, codenames, abbreviations, tools, teams, project names, and organizational units.

Initially, the activity data is analyzed at block 300 to identify one or more topics, information associated with the topic(s), other topics that are related to the identified topic, the users that know the topics, and/or one or more candidate definitions associated with each topic (blocks 302, 304, 306). In a non-limiting nonexclusive embodiment, the activity data is associated with multiple users in an enterprise, and the activity data is analyzed to detect the topic(s) and one or more candidate definitions for each topic. As discussed previously, the activity data includes, but is not limited to, electronic communications, documents, meetings, tasks, projects, internet browser activities, search history (e.g., browser search history), personal and/or product development, training, and other activities.

Information about at least one topic is determined and retrieved at block 304, where the information can include a definition (e.g., an acronym expansion), a description, people associated with the topic, content associated with the topic, and other information about the topic. In some in aspects, the type of information retrieved for a topic is based on the type of topic. For example, a definition can be obtained for an acronym. When the topic is a codename that represents a subject, such as a project, information such as a description of the project and the people associated with the project may be obtained.

Next, as shown in block 306, the users that know the topic(s) are identified. To identify the users that know the topics, the activity data is analyzed to identify the one or more topics, the associated information, and the users. For example, the assistant application determines if the user has used the topic in the past. Additionally, in one embodiment, it is assumed a user is familiar with or knows of a topic when the topic is used, discussed, and/or referred to in the activity data of the user (e.g., in an email). For example, a user can refer to a topic in a document and/or another person may refer to a topic in a communication that is received by the user. In some instances, the assistant application determines, via the activity data, if the user has previously searched for, accessed, or otherwise interacted with information on the topic, which strongly indicates the user knows of the topic.

A confidence score for each candidate definition is determined at block 308 for each user identified at block 306. A confidence score indicates a confidence or a probability that the user knows the topic is associated with a particular candidate definition. In some instances, the confidence score is based on the interactions the user has with a topic, the frequency of the interactions, other users associated with the user that used or referred to the topic, any searches performed by the user on the topic, and so on.

The topics, the information associated with the topics, the users that know the topic and associated candidate definitions, and the confidence scores are then stored at block 310. In one embodiment, the topic(s), the associated information, the users (or identifiers for the users), and the confidence scores are grouped into a global list of known topics and the global list is stored. In some instances, one or more topics that are related to a particular topic are also stored in the global list of known topics. An example global list of known topics is discussed in more detail in conjunction with FIG. 4.

In one embodiment, the activity data is analyzed in real-time, in substantially real-time, at regular intervals, at selected times, and/or on demand to detect new topics and to update the global list. A determination is made at block 312 as to whether a new topic is detected during the analysis process. If a determination is made that a new topic has not be detected, the method waits at block 312. When a determination is made at block 312 that a new topic is detected, the method continues at block 314 where the new topic, the information associated with the new topic, the user(s) that know associated candidate information for the new topic, and the confidence score(s) are obtained and the new topic, associated information, and confidence scores are stored in the global list.

FIG. 4 illustrates an example global list of known topics, information associated with the topics, users, and confidence scores in accordance with some embodiments. The example global list 400 is created at block 310 in FIG. 3. In the example embodiment shown in FIG. 4, the global list 400 includes five columns, a topic column 402, a definition column 404, a source column 406, a related topics column 408, and a user id column 410.

In FIG. 4, the topic is acronyms, and the topic column 402 includes the acronym "SSR" 412 and the acronym "TTS" 414. The acronym SSR 412 is associated with the definition 416 of search success rate, the definition 418 of service sales representative, and the definition 420 of small screen rendering. The acronym TTS 414 is associated with the definition 422 of time to success, the definition 424 of teacher training school, the definition 426 of time to stabilization, and the definition 428 of tenure track system. Different acronyms can be listed in other embodiments.

The source column 406 lists an identifier for the source of each definition 416, 418, 420, 422, 424, 426, 428. In the illustrated embodiment, the source of each definition 416, 418, 420, 422, 424, 426, 428 is a uniform resource locator (URL) 430. Other types of identifiers can be used in some embodiments. For example, the title of the document, the uniform resource identifier, and/or a file name may be listed as the source of a definition.

The related topics column 408 lists one or more topics for each acronym 412, 414 that are related to a respective definition 416, 418, 420, 422, 424, 426, 428. The related topic(s) are topics that co-occur with the respective definition 416, 418, 420, 422, 424, 426 428. In some embodiments, a related topic can co-occur with a respective definition frequently, recurrently, regularly, or a sufficient number of times within the same text or activity data and/or as part of the same subject matter. For example, the related topics 432 for the definition 416 are search, ranking, and metrics. The one or more related topics can be used to determine or confirm the correct definition of one or more topics. In a non-limiting nonexclusive example, an acronym is spoken during a meeting. The assistant application can use one or more related topics in addition to the definition(s) as known to the Speaker and possibly other persons (e.g., other persons in the meeting) to determine or confirm the correct definition of the acronym.

When a topic ("first topic") with multiple definitions is used in a conversation (e.g., in a meeting), the assistant application identifies one or more other topics that have been used in the conversation. For example, the assistant application analyzes the text of the conversation in substantially real-time to detect the one or more other topics using, for example, one or more text mining and/or data mining applications. In an online chat, the assistant application detects the other topic(s) in the text of the posted messages in substantially real-time (e.g., using one or more text mining and/or data mining applications). In one embodiment, the one or more other topics are collected into a list.

The assistant application determines the overlap between the other topic(s) in the list and the related topic(s) listed in the global list 400 for the multiple definitions associated with the first topic. The higher the overlap between the other topic(s) in the list and the related topic(s) for a respective definition associated with the first topic, the more likely the respective definition is the correct definition for the first topic. Additionally or alternatively, the assistant application may determine whether the one or more other topics in the list and the related topics listed in the global list 400 for the multiple definitions associated with the first topic belong to or are associated with the same subject matter. In one embodiment, the assistant application accesses a taxonomy of topics or semantic embeddings of topics to determine if the other topic(s) and the related topics belong to or are associated with the same subject matter. The semantic embeddings of topics can be created using deep learning mechanisms (e.g., algorithms, models, or applications), such as the Word2vec algorithm.

The user id column 410 lists one or more users (or user identifiers 434) that know the acronym 412, 414 and the associated definitions 416, 418, 420, 422, 424, 426, 428. In the illustrated embodiment, the user id column 410 also includes a confidence score 436 for each identified user. The confidence score indicates a confidence or a probability that the user knows a particular candidate definition is the definition for the topic. In some instances, the confidence score is based on which candidate definitions of the topic the user that used the topic knows, which candidate definitions of the topic are known by other persons in the conversation (e.g., a meeting), which candidate definitions other persons that are working with the user know of, and/or how well do other topics that have been mentioned in the conversation match or relate to the related topics listed in the global list 400 for each candidate definition. Additional or different factors for a confidence score can be considered in other embodiments.

In the example global list 400, each user and an associated confidence score are stored as a <user id, score> pair, and at least one <user id, score> pair can be stored with each acronym 412, 414 and associated definition 416, 418, 420, 422, 424, 426, 428. For example, for the acronym SSR 412 and the definition "search success rate" 416, the <user id, score> pair 438 includes the user id 2378 and the confidence score 0.8. The confidence score represents the probability (80%) that the user associated with the user id 2378 knows that SSR can mean search success rate. For the same acronym SSR 412 and the same associated definition 416, the <user id, score> pair 440 includes the user id 3234 and the confidence score 0.98. The confidence score represents the probability (98%) that the user associated with the user id 3234 knows SSR can mean search success rate. Alternatively, for the acronym TTS 414 and the definition "tenure track system" 428, the <user id, score> pair 442 includes the user id 3721 and the confidence score 0.67. The confidence score represents the probability (67%) that the user associated with the user id 3721 knows that TTS can mean tenure track system.

In some embodiments, the assistant application (e.g., assistant application 132 in FIG. 1) pre-generates the global list 400 and updates the global list by analyzing the activity data of multiple users (e.g., the users in an enterprise) in real-time, in substantially real-time, at selected times, or on demand. Based on the analysis of the activity data, the assistant application detects topics, infers one or more definitions of each topic, and infers which users are familiar with a <topic, definition> pair in real-time, in substantially real-time, at selected times, or on demand. In some embodiments, assistant application accesses publicly available sources (e.g., the Internet) and enterprise-internal lists of topics with definitions when detecting topics and inferring one or more definitions of each topic.

A global list 400 can include additional information or omit some of the information shown in FIG. 4. For example, the related topics may be omitted in other embodiments. Additionally or alternatively, the confidence score in the user id column can be omitted. In such embodiments, the definitions of a topic that are identified as being known to the user of the topic (e.g., the user that spoke the topic) are presented to another user as candidate definitions for the topic.

Figure 5A:
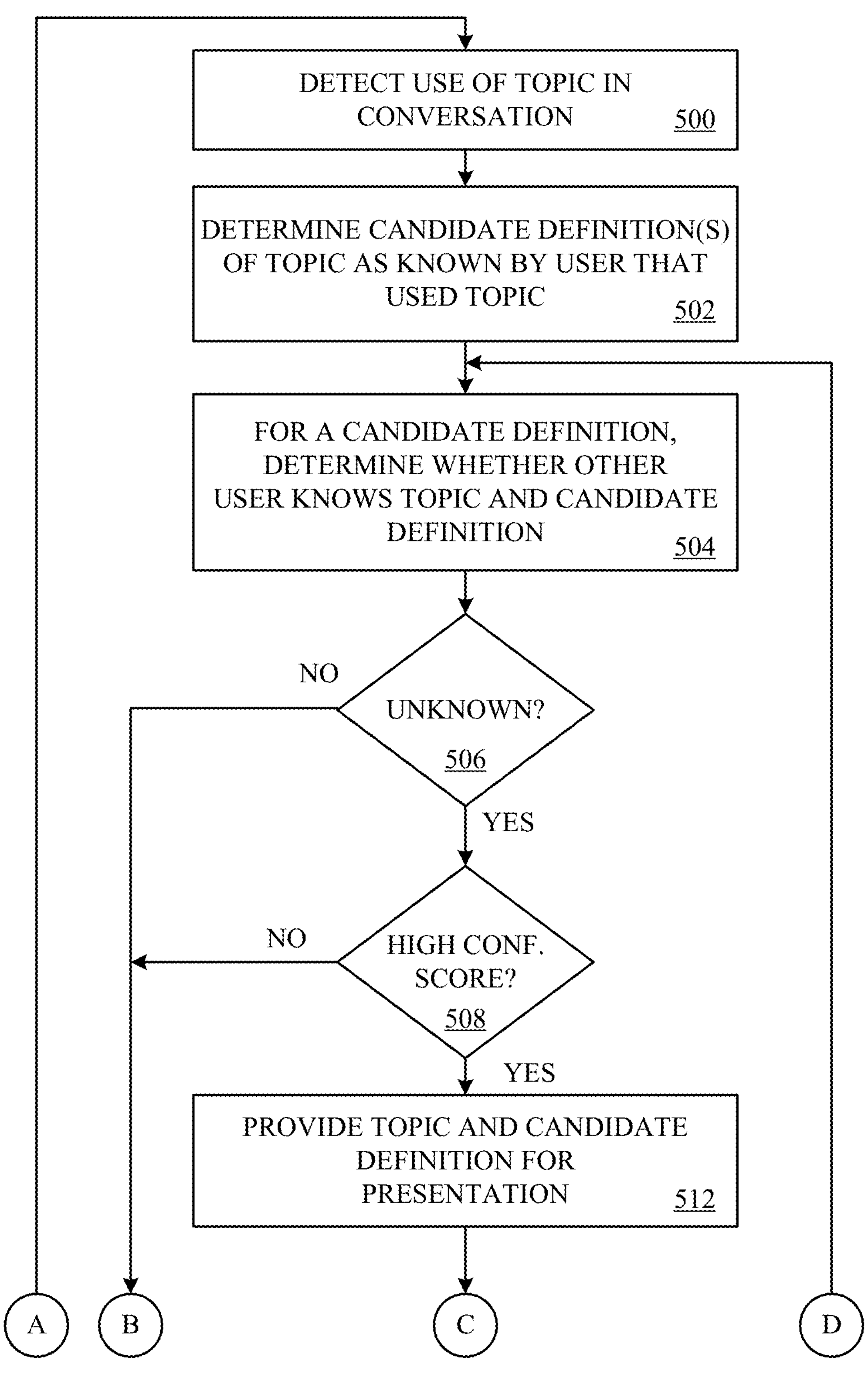
FIGS. 5A-5B illustrate a flowchart of a method of providing information on an unknown topic in accordance with some embodiments.
Figure 5B:
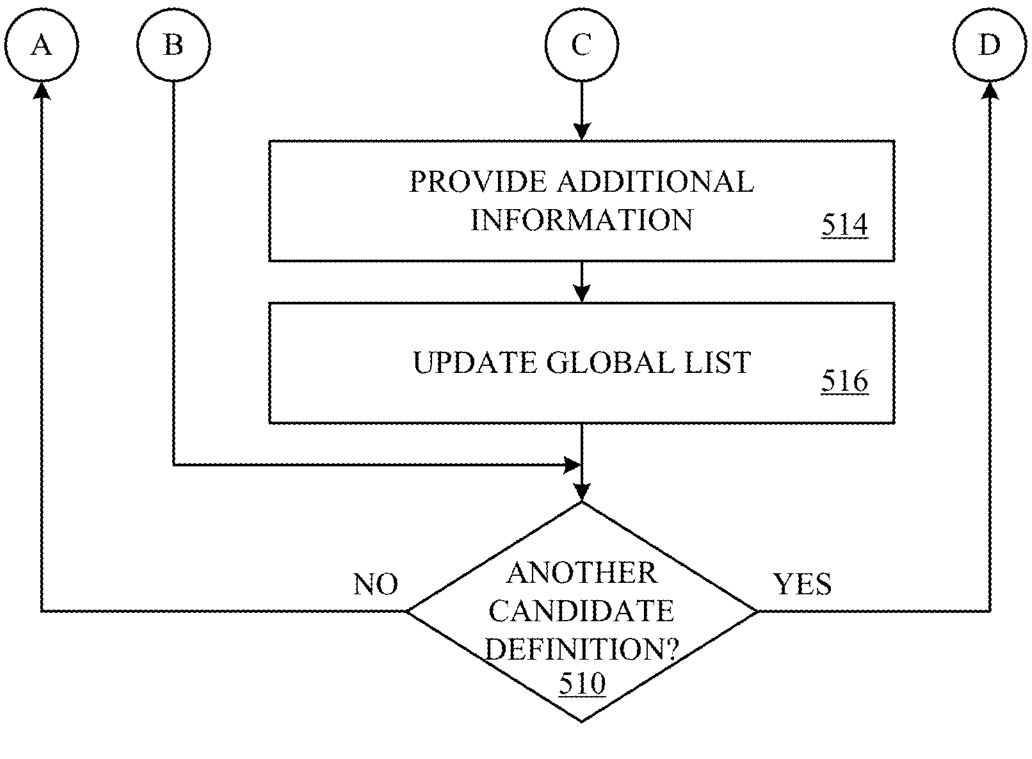

FIGS. 5A-5B illustrate a flowchart of a method of providing information on an unknown topic in accordance with some embodiments. In some instances, the method of FIGS. 5A-5B is performed after the global list 400 shown in FIG. 4 is initially generated. Although the illustrated method is described in conjunction with a first user that uses a topic and a second user that hears or reads the topic, other embodiments are not limited to this implementation. The method of FIGS. 5A-5B can be performed for multiple users at a time (e.g., multiple users in a meeting).

Initially, as shown in block 500, the use of a topic in a conversation is detected, where the conversation includes the first user and the second user. For example, the topic may be used in an online meeting, an online chat, a presentation, a seminar, or an in-person meeting. When the topic is used in an online or an in-person meeting, an STT application (e.g., STT application 130 in FIG. 1) converts the audio input of the meeting into text in substantially real-time and an assistant application (e.g., assistant application 132 in FIG. 1) analyzes the text in substantially real-time to detect the topic using, for example, one or more text mining and/or data mining applications. In an online chat, the assistant application detects the topic in the text of the posted messages in substantially real-time (e.g., using one or more text mining and/or data mining applications).

One or more candidate definitions of the topic as known by the first user (e.g., the user that spoke or wrote the topic) are determined at block 502. In a non-limiting nonexclusive example, the global list is reviewed to determine the candidate definition(s) of the topic that are known by the first user. Additionally or alternatively, the activity data associated with the first user is analyzed to ascertain the one or more candidate definitions of the topic or confirm the candidate definition(s) of the topic. In one embodiment, the first user's activity data is reviewed when the topic is not included in the global list.

The assistant application then determines at block 504 whether a second user (e.g., a user that heard the topic) knows the topic and an associated candidate definition for the topic. For example, the global list is reviewed to determine which users know the topic and the associated candidate definition. A determination is made at block 506 as to whether the topic and a candidate definition of the topic are unknown to the second user in the meeting. If the topic and the associated candidate definition are known to the second user, the method continues at block 510 where a determination is made as to whether another candidate definition is associated with the topic. The method returns to block 500 if a determination is made that another candidate definition is not available. The method returns to block 504 if a determination is made that another candidate definition is available.

When a determination is made at block 506 that a topic and the associated candidate definition are unknown to the second user, the method passes to block 508 where a determination is made as to whether a high confidence score (or a confidence score that is above a threshold value) is associated with the first user for the candidate definition. For example, as shown in FIG. 4, each user id can include a <user id, score> pair, where the confidence score represents a probability that the user associated with the user id knows the candidate definition is likely the definition for the topic. If a determination is made that the confidence score is not high, or is not above a threshold value, the method passes to block 510.

When a determination is made at block 508 that a high confidence score, or a confidence score that is above a threshold value, is associated with the candidate definition, the method continues at block 512 where the topic and the candidate definition are provided for presentation. For example, the topic and the candidate definition can be displayed on a display device as "The first user likely meant SSR to mean Search Success Rate."

In some embodiments, the assistant application considers the confidence score associated with the first user as well as a confidence score associated with the second user for the same candidate definition in determining whether to provide the topic and associated candidate definition for presentation. Since the global list (e.g., the user id column) identifies all users that know of a candidate definition, the first user and the second user may both be listed in the user id column for a particular candidate definition. For example, for the acronym SSR 412 and the definition 416 in FIG. 4, the user associated with the user id 2378 may be the first user and the user associated with the user id 2391 can be the second user. In such embodiments, the assistant application can consider the confidence score associated with both the first and the second users when determining whether to provide the topic and associated candidate definition to an output device for presentation to the second user.

In a non-limiting nonexclusive example, a confidence score of 0.85 is associated with the first user for a topic and associated candidate definition and a confidence score of 0.10 is associated with the second user for the same topic and associated candidate definition. Based on the low confidence score for the second user, the assistant application may determine to present the topic and associated candidate definition to the second user. Alternatively, if a confidence score of 0.85 is associated with the first user for a topic and associated candidate definition and a confidence score of 0.64 is associated with the second user for the same topic and associated candidate definition, the assistant application may determine to not present the topic and associated candidate definition to the second user based on the higher confidence score for the second user. In some embodiments, the determination of whether to present or not present a topic and associated candidate definition to a second user in view of a confidence score associated with the second user can be based on the confidence score meeting or exceeding a threshold value (or minimum value).

Next, as shown in block 514, additional information related to the topic can be provided for presentation. The additional information includes, but is not limited to, a reference to the source of the definition, the confidence score associated with the definition, and/or content that uses the topic or includes a reference to the topic. For example, a communication such as an email can be identified as a source of a definition of the topic.

The global list is updated to identify the second user as a user that knows the topic and the associated candidate definition (block 516). The global list may be updated, for example, based on the presentation of the topic and the associated candidate definition. Additionally or alternatively, the global list can be updated if the second user interacts with the candidate definition (e.g., selects the candidate definition), discusses the topic and/or the candidate definition with other users in the meeting or chat, and/or creates activity data that uses or references the topic and/or the candidate definition. The method then passes to block 510 and repeats for each candidate definition.

The candidate definitions(s) can be provided to one or more computing devices and/or output devices the second user is able to access during the meeting. In a non-limiting nonexclusive example, for an online meeting or chat, the one or more candidate definitions can be provided to a display screen and displayed in the GUI associated with the online meeting software application or the online chat software application, or in a separate GUI. In an in-person meeting, the candidate definition(s) may be provided to a display screen of another computing device associated with the second user, such as a mobile telephone. Other types of output devices that can present the one or more meanings to the second user include, but are not limited to, a braille reader, a speaker device, headphones or earbuds, a television, and a projector.

Figure 5C:
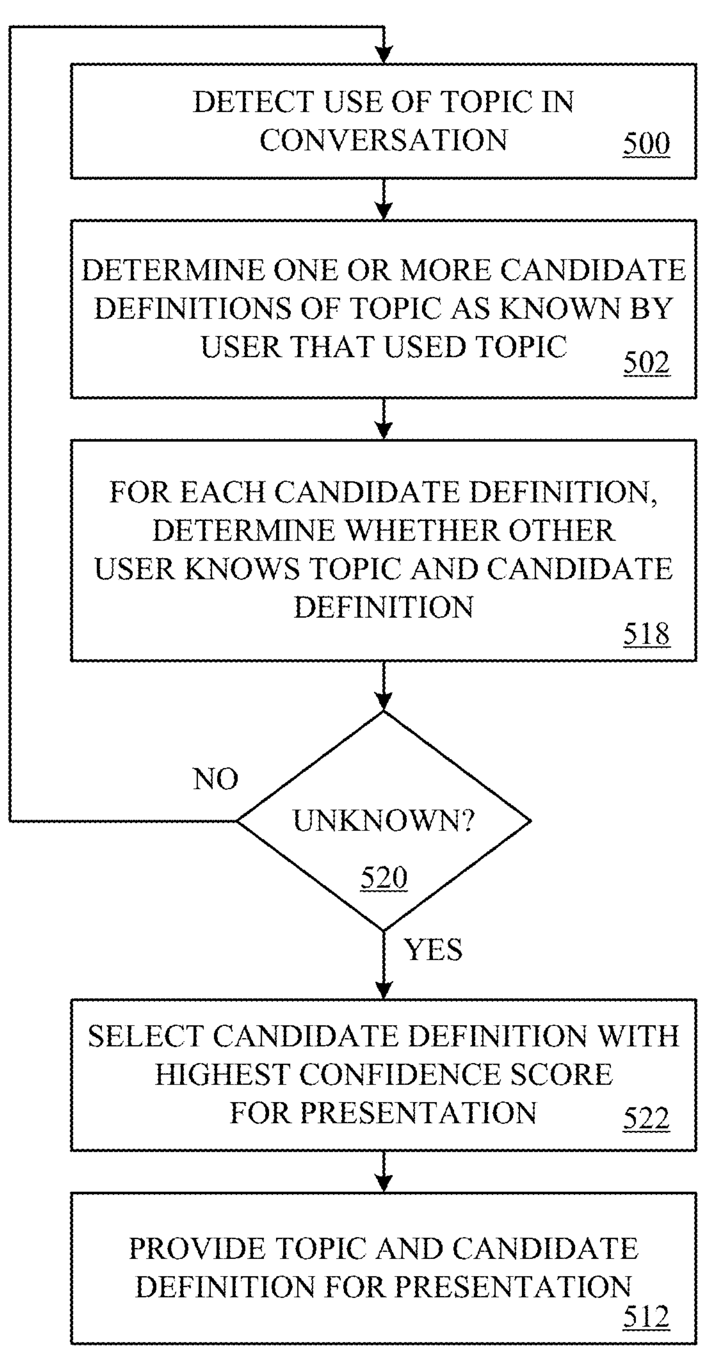
FIG. 5C illustrates an alternative flowchart to the flowchart shown in FIG. 5A in accordance with some embodiments.

The method depicted in FIGS. 5A-5B can produce one or multiple candidate definitions for a topic. FIG. 5C illustrates an alternative flowchart to the flowchart shown in FIG. 5A in accordance with some embodiments. The flowchart depicted in FIG. 5C is the same as the flowchart shown in FIG. 5A except for blocks 518, 520, 522. Although blocks 514 and 516 are not shown in FIG. 5C, blocks 514 and 516 can be performed after block 512 in some embodiments.

Generally, the method shown in FIG. 5C does not include a return loop to review one or more additional candidate definitions for a topic (e.g., block 510 is omitted). Instead, in FIG. 5C, the candidate definition that is associated with the highest confidence score is provided to one or more output devices. At block 518, the assistant application determines whether the second user knows each candidate definition for the topic. A determination is made at block 520 as to whether each candidate definition is unknown to the second user. If a determination is made at block 520 that the second user knows each candidate definition for the topic, the method returns to block 500. When a determination is made at block 520 that the second user does not know at least one candidate definition for the topic, the method continues at block 522 where the assistant application reviews the confidence score associated with the first user for each candidate definition and selects the candidate definition with the highest confidence score. The topic and the associated candidate definition with the highest confidence score are provided for presentation at block 512.

Figure 6A:
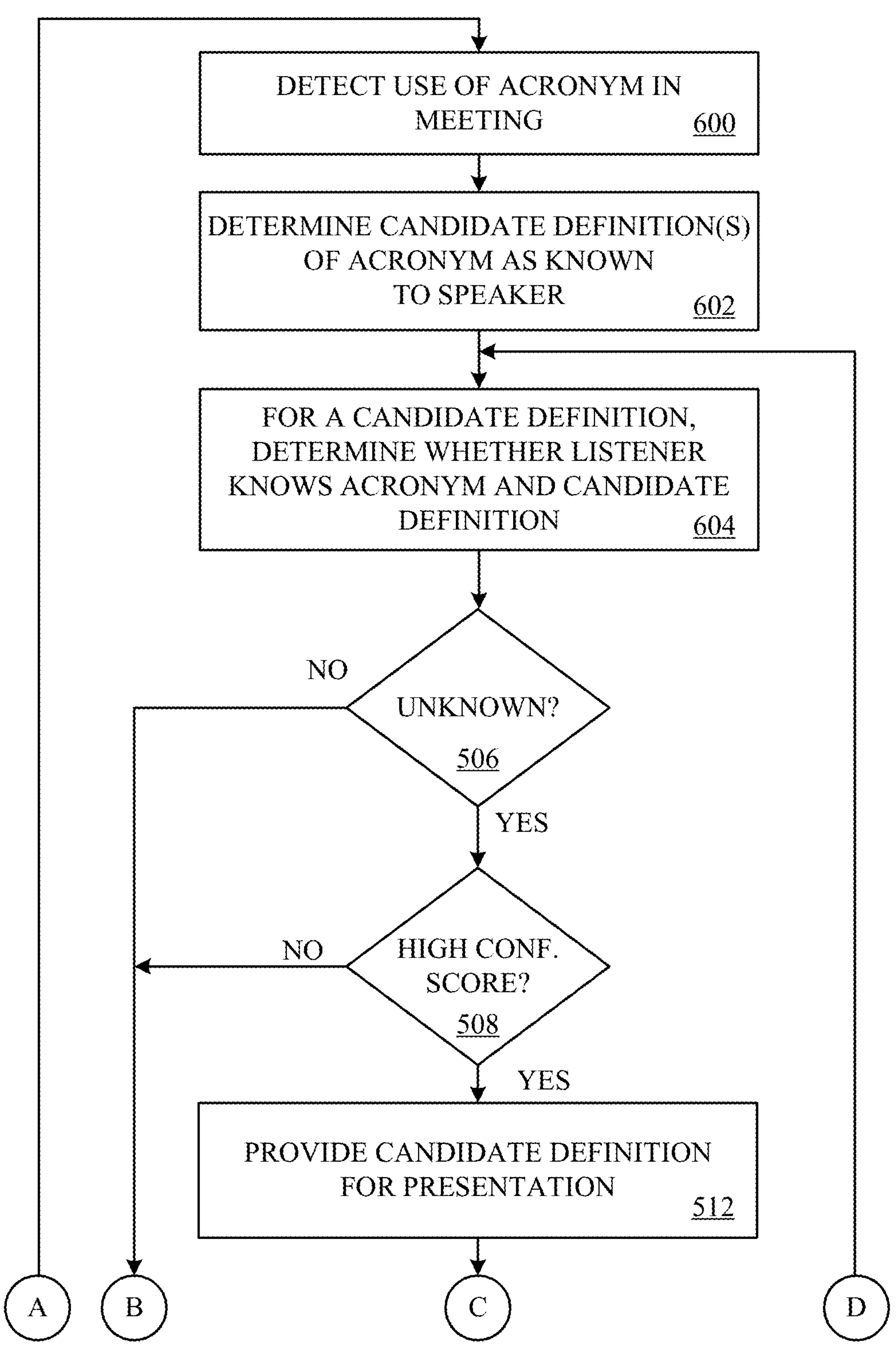
FIGS. 6A-6B illustrate a flowchart of a method of providing one or more meanings for an unknown acronym in accordance with some embodiments.
Figure 6B:
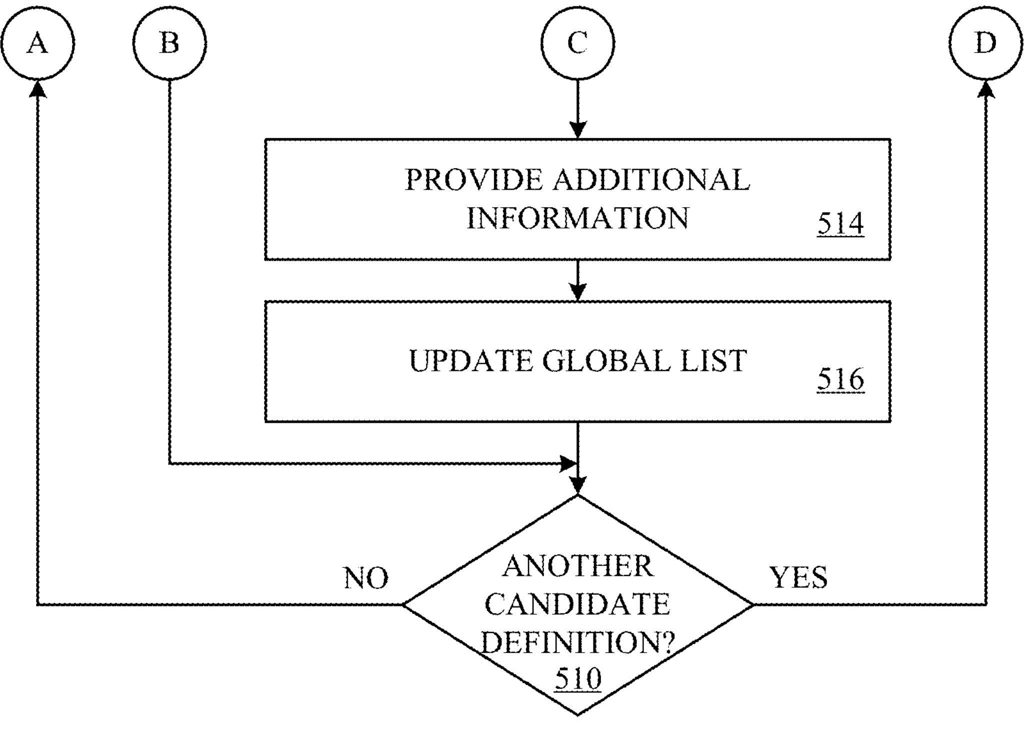

In some embodiments, the topic is an acronym and one or more meanings for the acronym are presented to a user. FIGS. 6A-6B illustrate a flowchart of a method of providing one or more meanings for an unknown acronym in accordance with some embodiments. Some of the blocks shown in FIGS. 5A-5B are included in the flowchart of FIGS. 6A-6B and are identified by the same reference number. For brevity, the descriptions of these blocks are not repeated in the discussion of FIGS. 6A-6B.

In this example embodiment, the unknown acronym is used by a first user (a speaker) in an online meeting. The usage of the acronym during the online meeting is detected at block 500. As described earlier, an STT application (e.g., STT application 130 in FIG. 1) is converting the audio input of the online meeting into text in substantially real-time and an assistant application (e.g., assistant application 132 in FIG. 1) is analyzing the text in substantially real-time to detect acronyms. In one embodiment, the assistant application detects the acronym using one or more text mining and/or data mining applications.

The meaning of the acronym as understood by the speaker is determined at block 602. In a non-limiting nonexclusive example, the global list is reviewed to determine the candidate definition(s) of the acronym that are known by the speaker. Additionally or alternatively, the activity data associated with the speaker is analyzed to ascertain the one or more candidate definitions of the acronym or confirm the candidate definition(s) of the acronym. In one embodiment, the speaker's activity data is reviewed when the acronym is not included in the global list.

Next, as shown in block 604, the assistant application determines whether a second user (e.g., a listener) knows the acronym and an associated candidate definition for that acronym. For example, the global list is reviewed to determine which users know the acronym and the associated candidate definition. A determination is made at block 506 as to whether the acronym is unknown to the listener. If a determination is made that the listener knows the acronym, the method passes to block 510.

When a determination is made at block 506 that the acronym is unknown to the listener, the method continues at block 508. Block 510 or blocks 512, 514, and 516 are then performed. In some embodiments, the method shown in FIGS. 6A-6B can be implemented to execute similar to the method depicted in FIG. 5C, where only the candidate definition with the highest confidence score is provided for presentation. Additionally or alternatively, the confidence scores associated with both the speaker and the listener for the acronym and associated candidate definition are considered when determining whether the listener knows the acronym and associated candidate definition (see description of FIG. 5).

Figure 7:
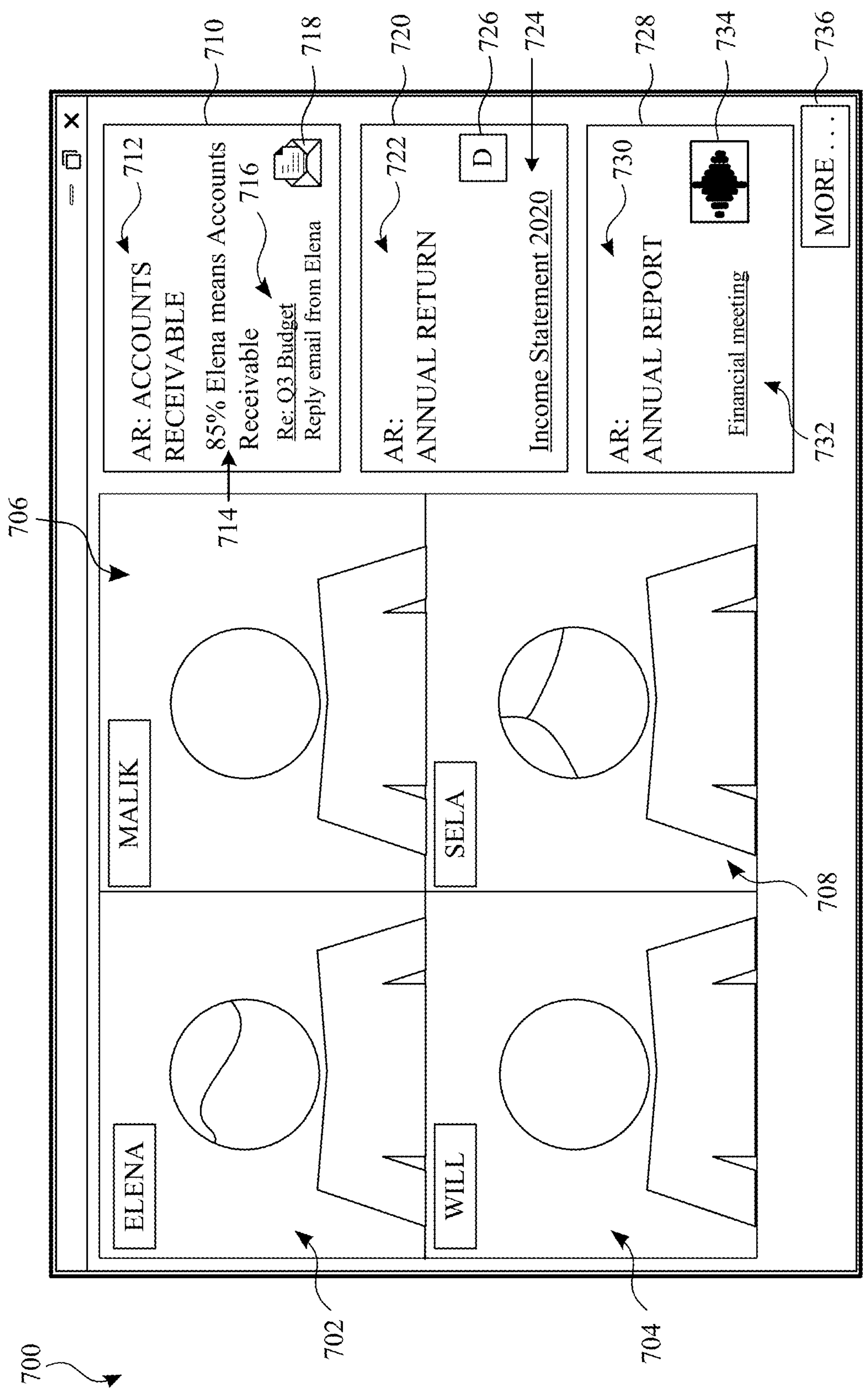
FIG. 7 illustrates an example GUI that presents one or more definitions for an unknown acronym in accordance with some embodiments.

FIG. 7 illustrates an example GUI that presents one or more meanings for an unknown acronym in accordance with some embodiments. The example GUI 700 is associated with an online meeting software application. There are four users in the online meeting; Elena, Will, Malik, and Sela. The GUI 700 presents a display window or panel 702 for Elena, a panel 704 for Will, a panel 706 for Malik, and a panel 708 for Sela. The GUI 700 is presented on a computing device that is used by one of the users, for example by Will.

During the online meeting, a user such as Elena uses the acronym "AR" during her conversation or presentation. In general, the acronym "AR" has several definitions. For example, "AR" can mean accounts receivable, augmented reality, annual return, alternate reality, annual report, the state of Arkansas, Army regulation, assault rifle, the chemical element Argon, and annual review. An assistant application (e.g., assistant application 132 in FIG. 1) detects the use of the acronym and determines that the acronym "AR"

is unknown to Will. Accordingly, the assistant application causes one or more definitions of "AR" that have been identified as known to Elena to be displayed in the GUI 700.

In the illustrated GUI 700, three definitions of "AR" are displayed. The panel 710 presents a definition 712 for AR as "Accounts Receivable." Additional information for the definition 712 is also displayed. The additional information includes a confidence score (85%) 714 that indicates a probability (85%) that Elena knows that AR can mean "Accounts Receivable". The confidence score 714 is displayed with information that indicates there is a probability of 85% that Elena means accounts receivable when she used the acronym AR. The additional information further includes a source 716 of the definition 712 and a graphical representation 718 of the source 716. The source 716 is a reply email that Will received from Elena. The reply email relates to the Q3 Budget. In some instances, the graphical representation 718 functions as a link that, when selected (e.g., clicked on), causes the reply email to open, causes an email software application to launch and display the reply email, or causes presentation of a folder that stores the reply email.

The panel 720 presents a definition 722 for AR as "Annual Return." Additional information for the definition 722 is also displayed. The additional information includes a source 724 of the definition 722 and a graphical representation 726 of the source 724. The source 724 is a document entitled "Income Statement 2020" and the acronym AR is discussed or referred to in the document. In some instances, the graphical representation 726 functions as a link.

The panel 728 presents a definition 730 for AR as "Annual Report." Additional information for the definition 730 is also displayed. The additional information includes a source 732 of the definition 730, which is identified as a financial meeting. A graphical representation 734 that represents an audio recording of the financial meeting is also displayed in the panel 728. In some instances, the graphical representation 734 functions as a link that when selected (e.g., clicked on), causes the audio file of the recording to open, causes a media player to launch and play the audio recording, or causes presentation of a folder that stores the audio recording.

An input element 736 may be included in the GUI 700. Selection of the input element 736 can cause additional meanings to be presented and/or cause additional information to be presented. The additional information may include the details of the online meeting, information related to the subject matter of the online meeting, contact information for one or more of the users Elena, Will, Malik, or Sela, and other information. The input element 736 can be any suitable type of input element, including, but not limited to, a button and a checkbox.

Figure 8A:
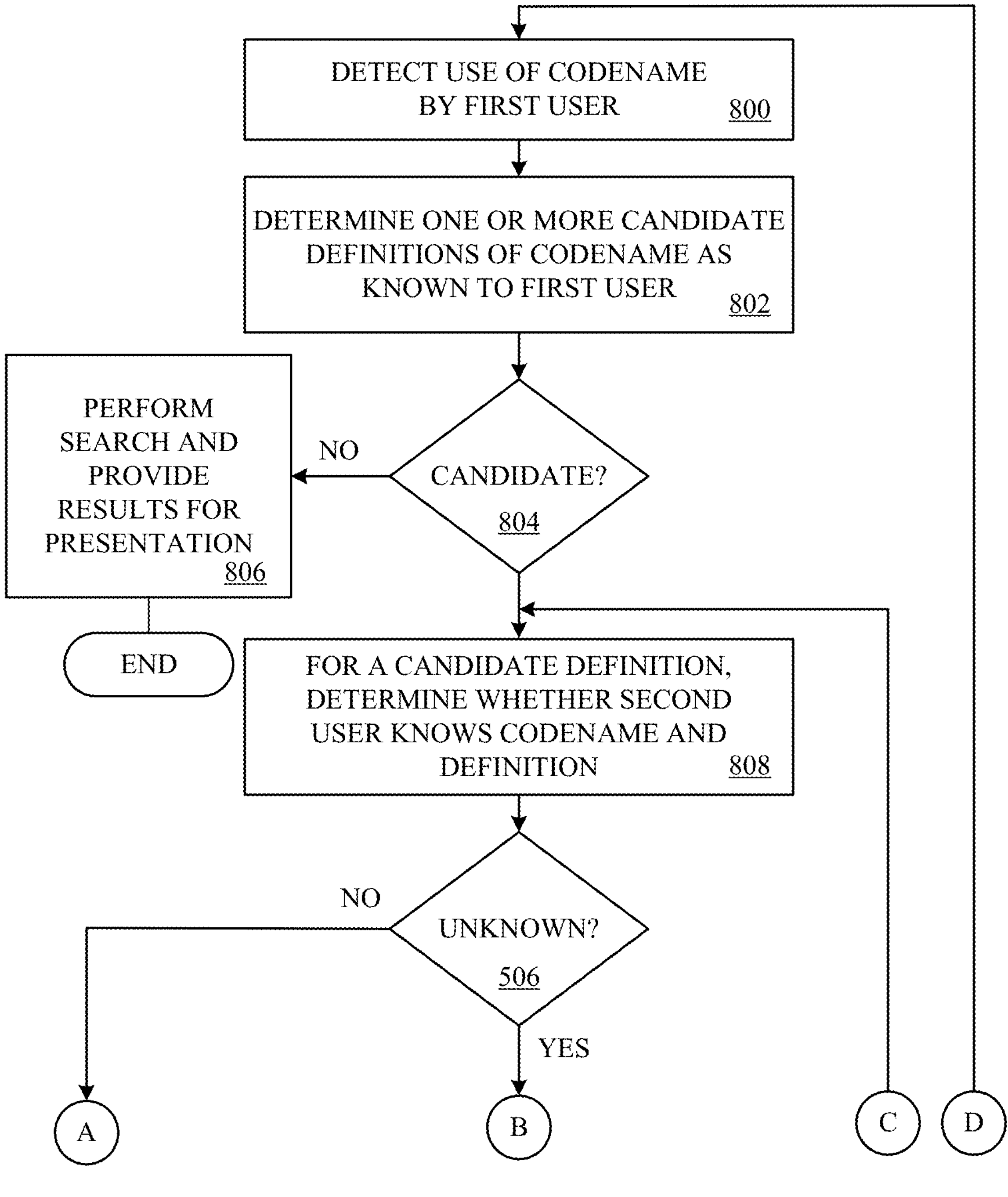
FIGS. 8A-8B illustrate a flowchart of a method of providing information on an unknown codename in accordance with some embodiments.
Figure 8B:
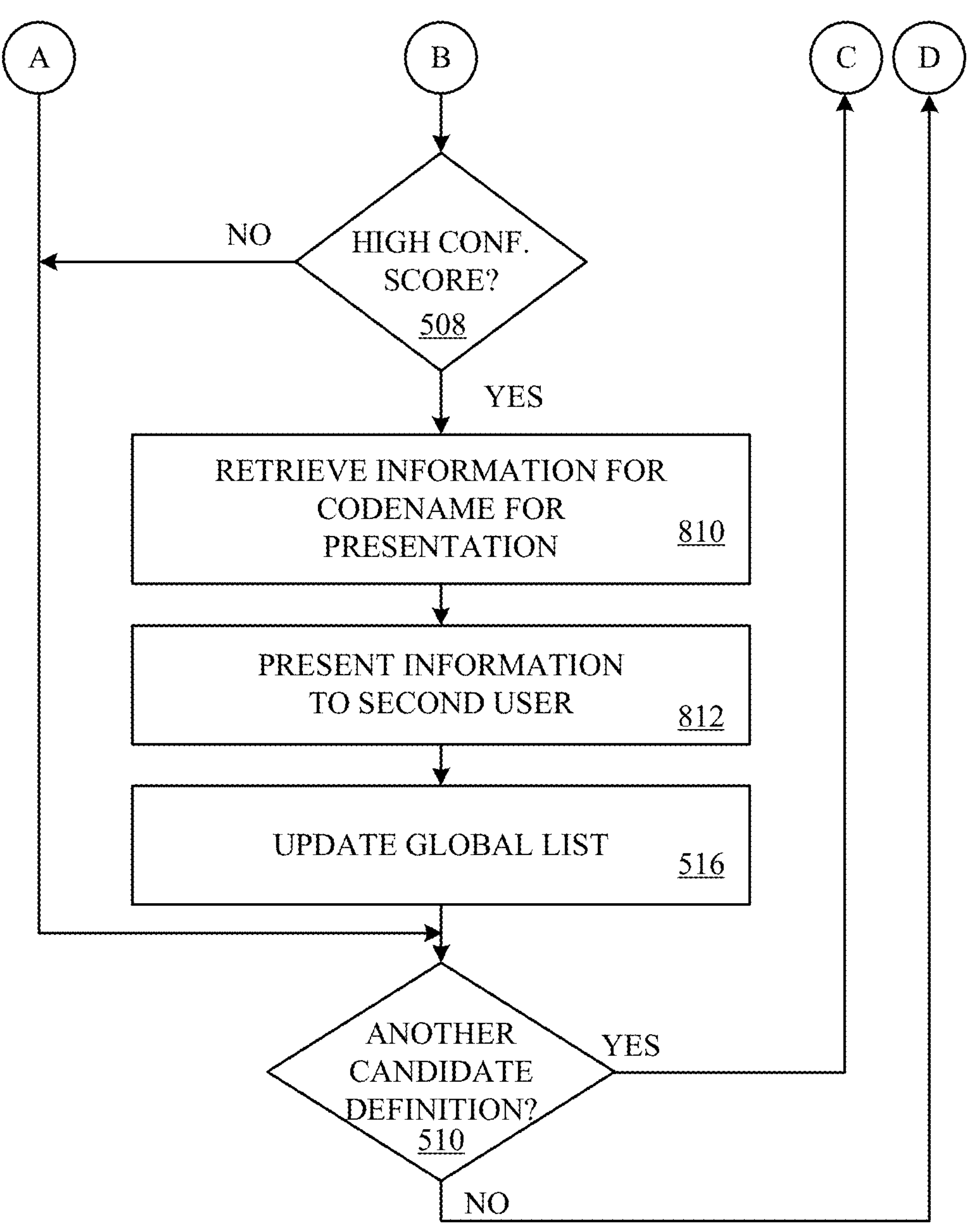

In some embodiments, the topic can be a codename that represents a subject such as a project, a task, a client, an event, or other item. In such instances, information related to the subject associated with the codename is presented to a user. FIGS. 8A-8B illustrate a flowchart of a method of providing information on an unknown codename in accordance with some embodiments. Some of the blocks shown in FIG. 5 are included in the flowchart of FIGS. 8A-8B and are identified by the same reference number. For brevity, the descriptions of these blocks are not repeated in the discussion of FIGS. 8A-8B.

In this example embodiment, the unknown codename is for a project and is used by a first user in an in-person meeting. The usage of the codename during the in-person meeting is detected at block 800. For example, in one embodiment a STT application (e.g., STT application 130 in FIG. 1) is receiving the audio input of the in-person meeting and converting the audio input into text in substantially real-time. An assistant application (e.g., assistant application 132 in FIG. 1) analyzes the text and detects the usage of the codename.

In some entities, a codename for a project is reused after a period of time. Thus, the codename spoken by the first user can be a codename for a current project or a prior project. Accordingly, the definition of the codename as understood by the first user is determined at block 802. In a non-limiting example, the global list is reviewed to locate the codename and one or more candidate definitions of the codename. Additionally or alternatively, the activity data of the first user is analyzed to determine or to confirm the definition of the codename. For example, the first user's activity data can be reviewed when the codename is not included in the global list.

Next, as shown in block 804, a determination is made as to whether a candidate definition for the codename is available (e.g., is in the global list). If a determination is made that a candidate definition is not available (e.g., not in the global list and not in the activity data), the method passes to block 806 where a search of publicly available data is performed, and the search results are provided for presentation. For example, the search of the publicly available data may be an Internet search. The method ends after block 806 is performed.

When a determination is made at block 806 that at least one candidate definition is available, the method continues at block 808 where the assistant application determines whether a second user (e.g., a user that heard the topic) knows the codename and an associated candidate definition for the codename. For example, the global list is reviewed to determine which users know the codename and the associated candidate definition of the codename.

A determination is made at block 506 as to whether the codename and a candidate definition of the codename are unknown to the second user. If a determination is made that the codename and the meaning are known to the second user, the method passes to block 510. When a determination is made at block 506 that the codename and the candidate definition are unknown to the second user, the method passes to block 508.

Information associated with the candidate definition of the codename is retrieved for presentation at block 810. The information associated with a project includes, but is not limited to, a description, information on the people who are working on and/or are associated with the project, information on one or more tasks associated with the project, and content that is relevant to the project. In some embodiments, the confidence scores associated with both the first user and the second user for the codename and associated candidate definition are considered when determining whether to present the codename and associated candidate definition to the second user (see description FIG. 5).

The codename and the information are presented to the second user (block 812), and the global list is updated (block 516). The information can be provided to one or more computing devices and/or output devices that are accessible to the second user in the in-person meeting. For example, the information may be displayed on a mobile telephone, a laptop computer, a television, and/or a projector.

Figure 9:
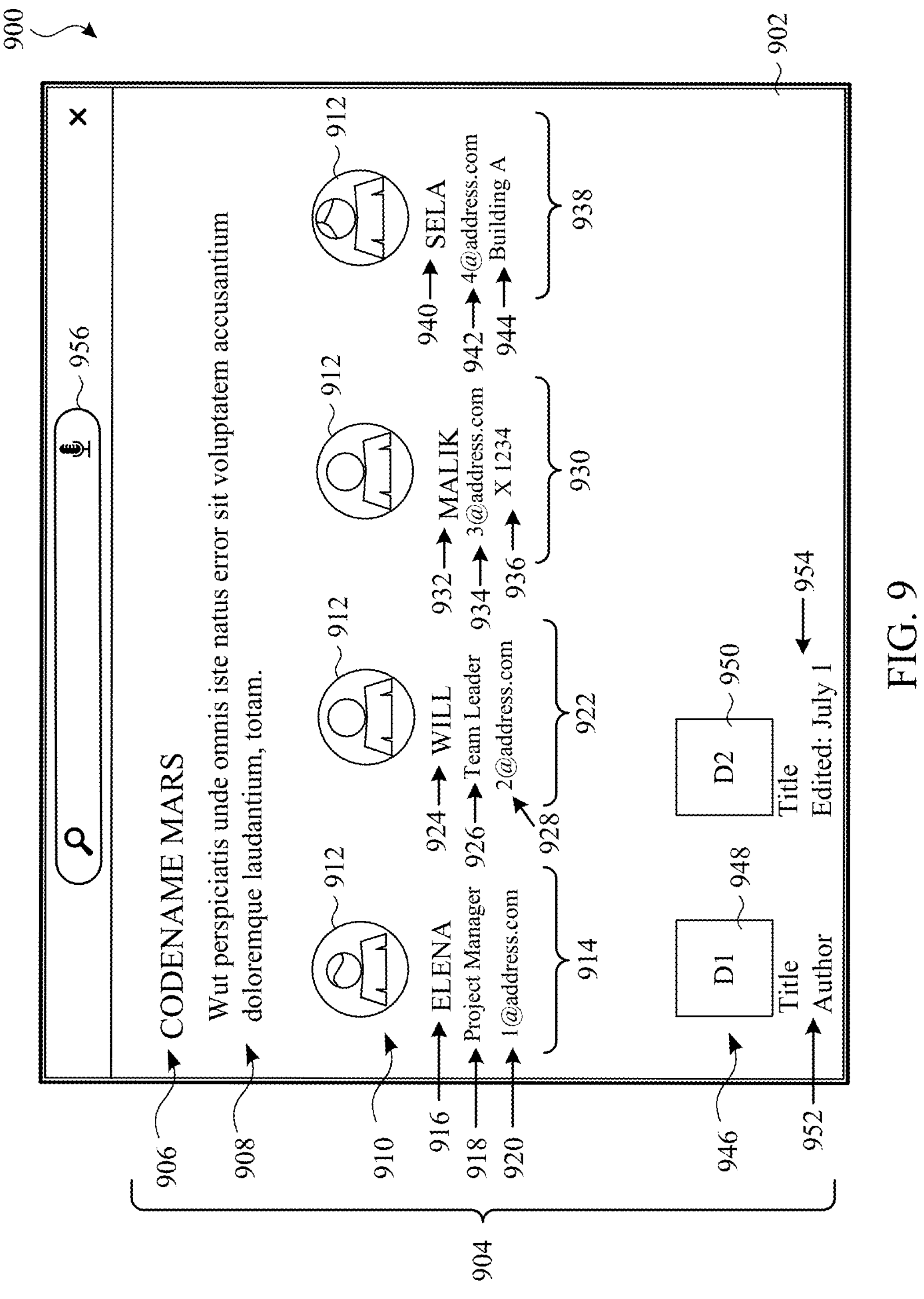
FIG. 9 illustrates an example GUI that presents information associated with an unknown codename in accordance with some embodiments.

FIG. 9 illustrates an example GUI that presents information associated with an unknown codename in accordance with some embodiments. The GUI 900 includes a panel 902 that presents information 904 on a project associated with the codename 906 "Mars." The information 904 includes a description 908 of the project. The panel 902 includes an area 910 for providing information on one or more users that work on or are associated with the project. In the illustrated embodiment, the area 910 displays graphical representations 912 of four users, Elena, Will, Malik, and Sela. Each graphical representation 912 can be a photograph of the user, an image selected by or for the user, or a graphical representation (e.g., avatar) that is associated with the user.

Other information for the users may be presented. For example, the user information 914 for Elena includes her name 916, her title 918 on the project, and an email address 920. The user information 922 for Will includes his name 924, his title 926 on the project, and an email address 928. The user information 930 for Malik includes his name 932, an email address 934, and telephone extension 936. The user information 938 for Sela includes her name 940, an email address 942, and a location 944 of her office. Other types of information can be displayed in other embodiments. For example, user information such as an address, a facsimile number, a name of an assistant, an indicator that indicates if the user is currently online or in the office (e.g., green circle for online or in office, red circle for offline or out of office), a name of a manager or supervisor, one or more current tasks the user is associated with, and/or a link to a curriculum vitae can be presented.

In some embodiments, the panel 902 includes an area 946 that lists or displays content associated with the project. For example, the area 946 may present links to documents, communications, calendars, and other content that is relevant to the project. In the illustrated GUI 900, the area 946 displays a document D1 948 and a document D2 950. In some instances, at least one graphical representation of a document 948, 950 functions as a link that when selected (e.g., clicked on), causes the document to open, causes a software application to launch and display the document, or causes presentation of a folder that stores the document.

Additional information may be displayed for one or more content items in the area 946. In the example embodiment, the additional information 952 for the document D1 948 is a title and an author of the document. The additional information 954 for the document D2 950 is a title and a date of the last edit to the document. Other additional information can be displayed in other embodiments. For example, a brief description of the content, a version number of the content, and/or a storage location of the content may be presented.

A search tool 956 can be included in the GUI 900. The search tool 956 enables a user to search for information on a subject (e.g., a codename or a project) and/or for additional information on the project associated with the codename 906.

Figure 10:
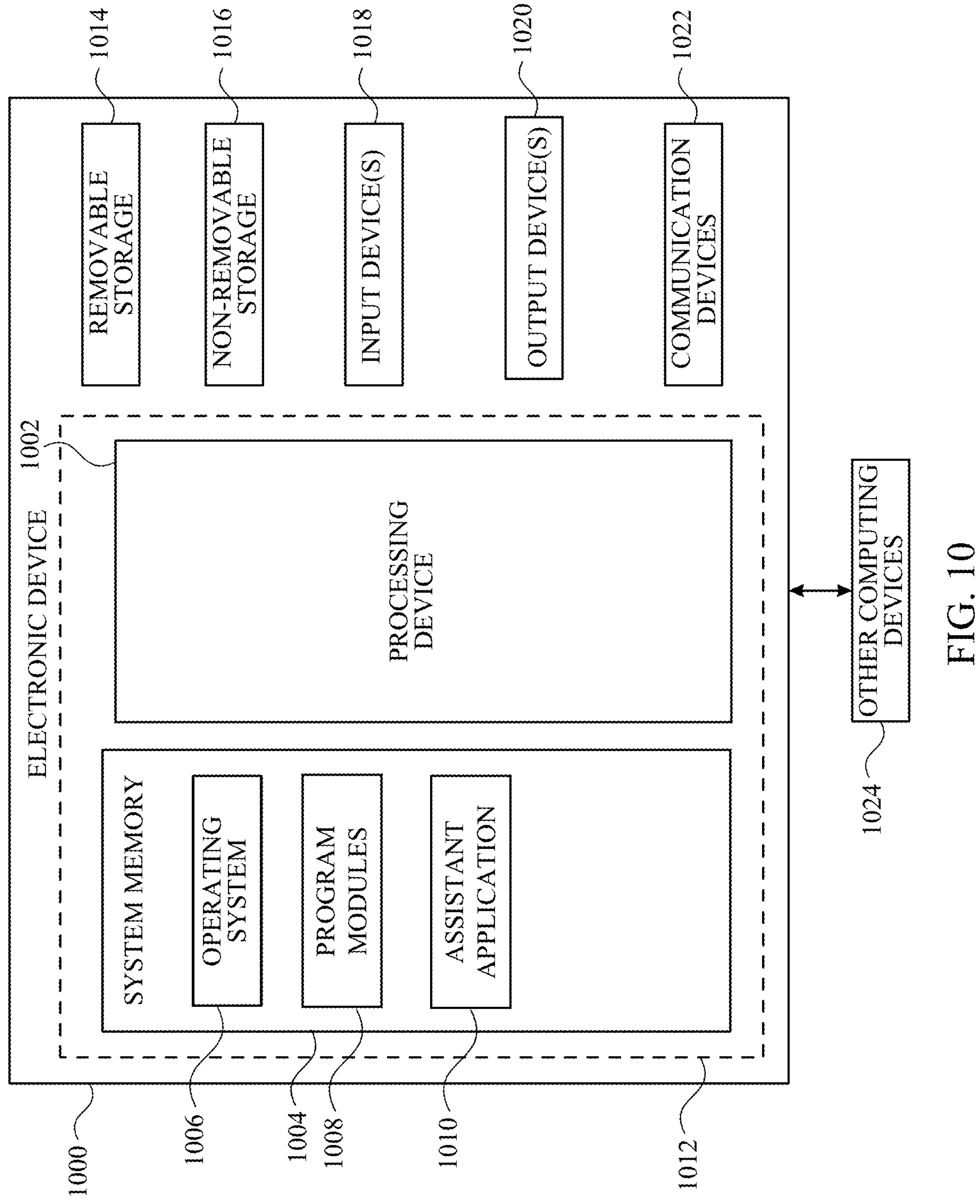
FIG. 10 illustrates a block diagram depicting example physical components of a computing device with which aspects of the disclosure may be practiced.
Figure 11A:
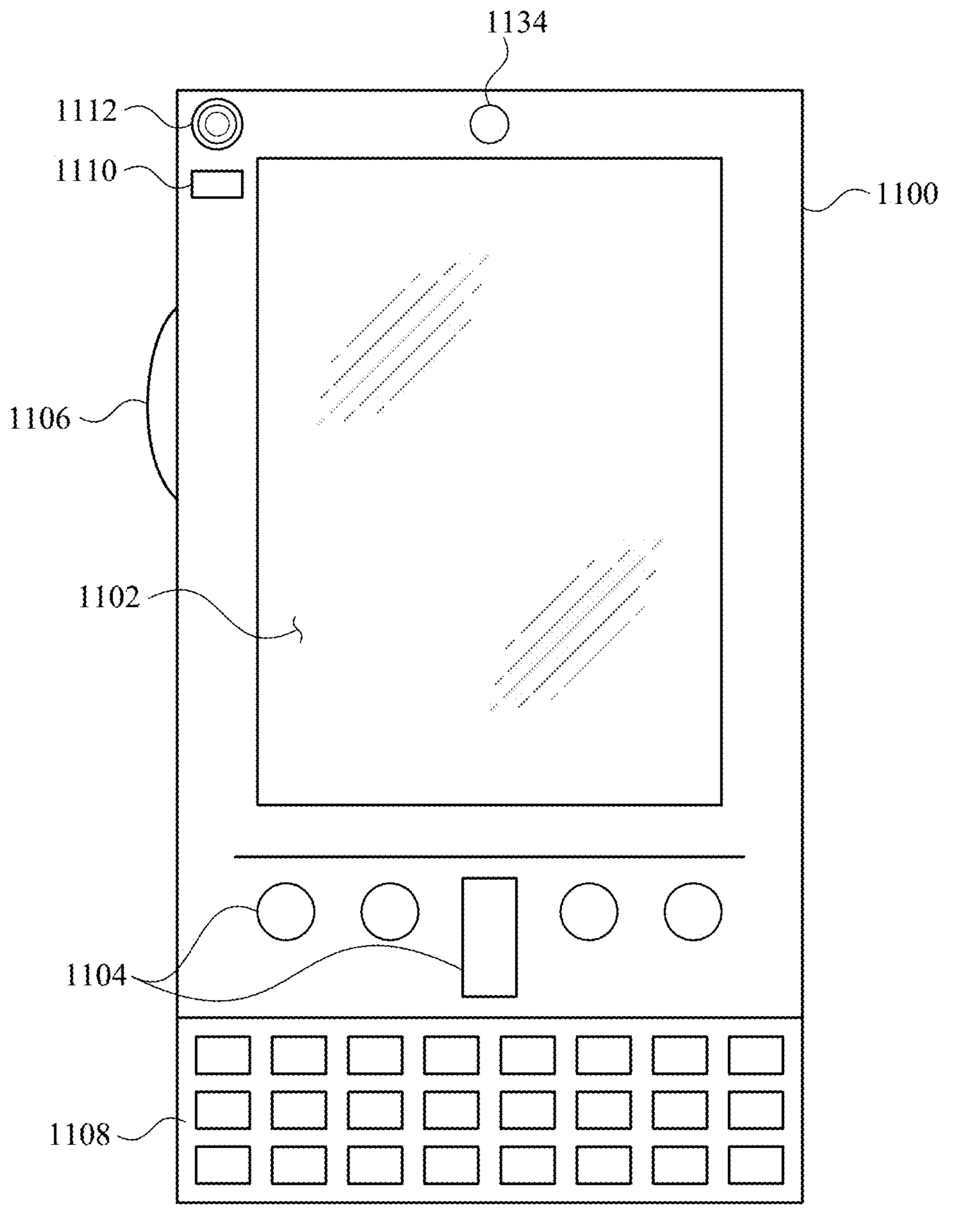
FIGS. 11A-11B illustrate block diagrams illustrating a mobile computing device with which aspects of the present disclosure may be practiced.
Figure 11B:
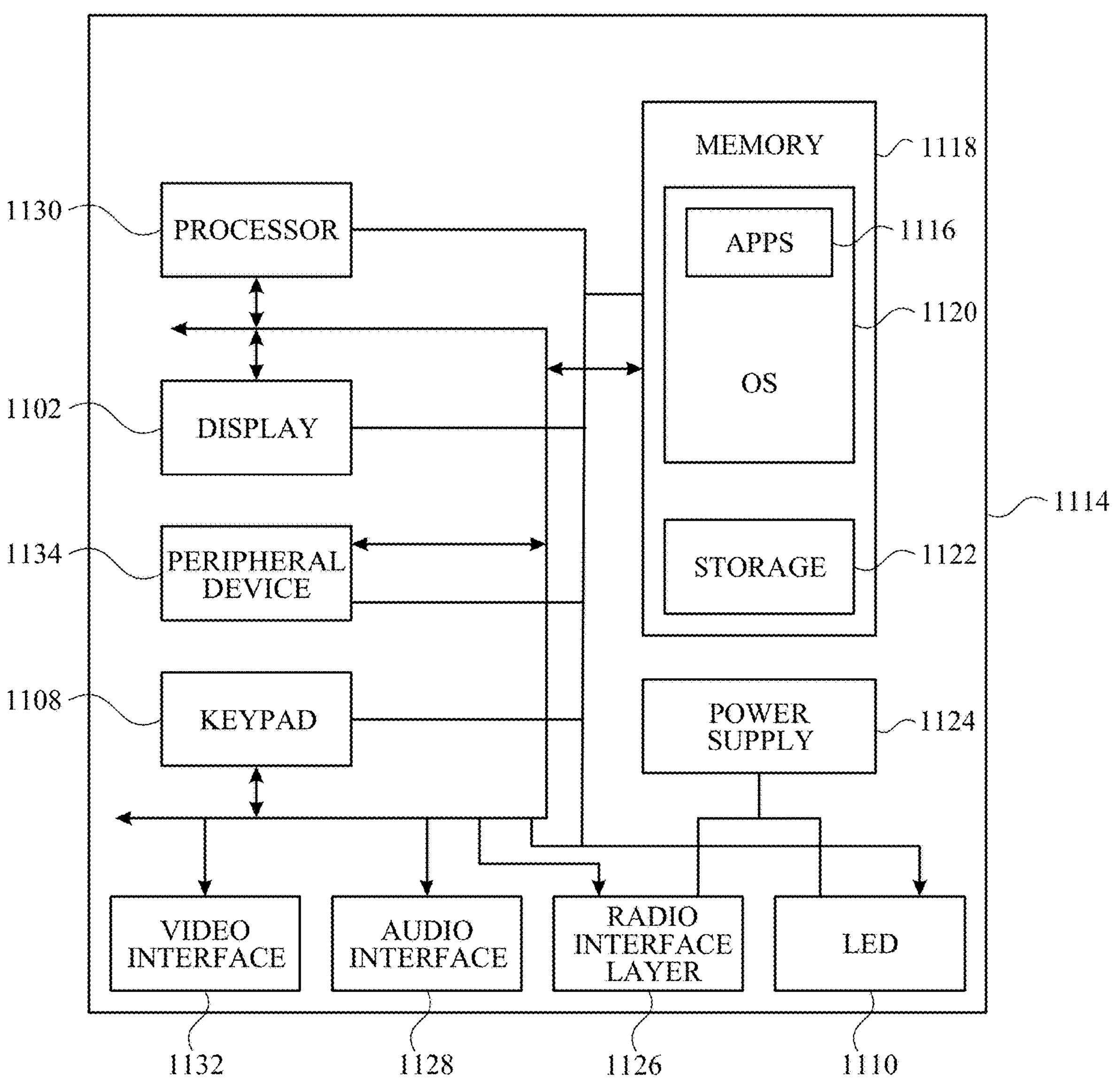
Figure 12:
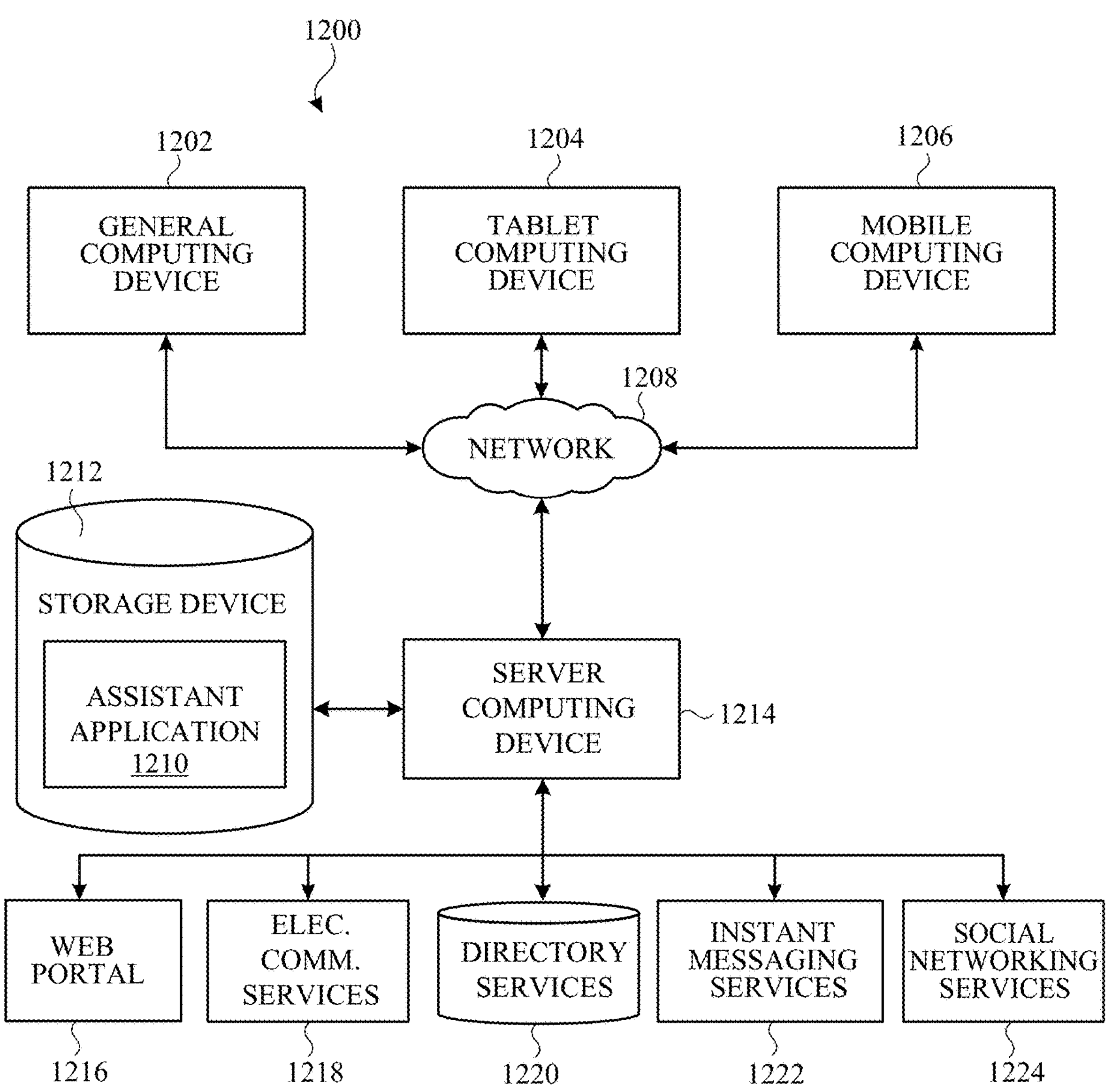
FIG. 12 illustrates a block diagram of a distributed computing system in which aspects of the present disclosure may be practiced.

FIGS. 10-12 and the associated descriptions provide a discussion of a variety of operating environments in which aspects of the disclosure may be practiced. However, the devices and systems illustrated and discussed with respect to FIGS. 10-12 are for purposes of example and illustration and are not limiting of a vast number of electronic device configurations that may be utilize for practicing aspects of the disclosure, as described herein.

FIG. 10 is a block diagram illustrating physical components (e.g., hardware) of an electronic device with which aspects of the disclosure may be practiced. In a basic configuration, the electronic device 1000 may include at least one processing device 1002 and a memory 1004. Any suitable processing device 1002 can be used. For example, the processing device 1002 may be a microprocessor, an application specific integrated circuit, a field programmable gate array, or combinations thereof.

Depending on the configuration and type of the electronic device 1000, the memory 1004 may comprise, but is not limited to, volatile storage (e.g., random access memory), non-volatile storage (e.g., read-only memory), flash memory, or any combination of such memories. The memory 1004 may include a number of program modules and data files, such as an operating system 1006, program modules 1008, and an assistant software application 1010. While executing on the processing device 1002, the assistant software application 1010 may perform and/or cause to be performed processes including, but not limited to, the aspects as described herein.

The operating system 1006, for example, may be suitable for controlling the operation of the electronic device 1000. Furthermore, embodiments of the disclosure may be practiced in conjunction with a graphics library, other operating systems, or any other application program and is not limited to any particular application or system. This basic configuration is illustrated in FIG. 10 by those components within a dashed line 1012.

The electronic device 1000 may have additional features or functionality. For example, the electronic device 1000 may also include additional data storage devices (removable and/or non-removable) such as, for example, magnetic disks, optical disks, or tape. Such additional storage is illustrated in FIG. 10 by a removable storage device 1014 and a non-removable storage device 1016.

The electronic device 1000 may also have one or more input device(s) 1018 such as a keyboard, a trackpad, a mouse, a pen, a sound or voice input device, a touch, force and/or swipe input device, etc. The output device(s) 1020 such as a display, speakers, a printer, etc. may also be included. The aforementioned devices are examples and others may be used. The electronic device 1000 may include one or more communication devices 1022 allowing communications with other electronic devices 1024. Examples of suitable communication devices 1022 include, but are not limited to, radio frequency (RF) transmitter, receiver, and/or transceiver circuitry; universal serial bus (USB), parallel, and/or serial ports.

The term computer-readable media as used herein may include storage media or devices. The storage media or devices may include volatile and nonvolatile, removable, and non-removable media implemented in any method or technology for storage of information, such as computer readable instructions, data structures, or program modules.

The memory 1004, the removable storage device 1014, and the non-removable storage device 1016 are all examples of storage devices. Each storage device may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the electronic device 1000. Any such storage device may be part of the electronic device 1000. In one embodiment, the storage device does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 10 may be integrated onto a single integrated circuit. Such an SOC device may include one or more processing units, graphics units, communications units, system virtualization units and various application functionality all of which are integrated (or "burned") onto the chip substrate as a single integrated circuit.

When operating via an SOC, the functionality described herein, with respect to the capability of client to switch protocols may be operated via application-specific logic integrated with other components of the electronic device 1000 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

FIGS. 11A-11B illustrate a mobile electronic device 1100, for example, a mobile telephone, a smart phone, wearable computer (such as a smart watch), a tablet computer, a laptop computer, and the like, with which embodiments of the disclosure may be practiced. With reference to FIG. 11A, one aspect of a mobile electronic device 1100 for implementing the aspects described herein is illustrated.

In a basic configuration, the mobile electronic device 1100 is a handheld computer having both input elements and output elements. The mobile electronic device 1100 typically includes a display 1102 and one or more input buttons 1104 that allow the user to enter information into the mobile electronic device 1100. The display 1102 of the mobile electronic device 1100 may also function as an input device (e.g., a display that accepts touch and/or force input).

If included, an optional side input element 1106 allows further user input. The side input element 1106 may be a rotary switch, a button, or any other type of manual input element. In alternative aspects, mobile electronic device 1100 may incorporate more or less input elements. For example, the display 1102 may not be a touch screen in some embodiments. In yet another alternative embodiment, the mobile electronic device 1100 is a portable phone system, such as a cellular phone. The mobile electronic device 1100 may also include an optional keypad 1108. Optional keypad 1108 may be a physical keypad or a "soft" keypad generated on the touch screen display.

In various embodiments, the output elements include the display 1102 for showing a graphical user interface (GUI) of a client or developer portal, a visual indicator 1110 (e.g., a light emitting diode), and/or an audio transducer 1112 (e.g., a speaker). In some aspects, the mobile electronic device 1100 incorporates a vibration transducer for providing the user with tactile feedback. In yet another aspect, the mobile electronic device 1100 incorporates input and/or output ports, such as an audio input (e.g., a microphone jack), an audio output (e.g., a headphone jack), and a video output (e.g., a HDMI port) for sending signals to or receiving signals from an external device.

FIG. 11B is a block diagram illustrating the architecture of one aspect of a mobile electronic device 1100. That is, the mobile electronic device 1100 can incorporate a system (e.g., an architecture) 1114 to implement some aspects. In one embodiment, the system 1114 is implemented as a "smart phone" capable of running one or more applications (e.g., browser, e-mail, calendaring, contact managers, messaging clients, games, media clients/players, diagramming, and sharing applications and so on). In some aspects, the system 1114 is integrated as an electronic device, such as an integrated personal digital assistant (PDA) and wireless phone.

One or more application programs 1116 may be loaded into the memory 1118 and run on or in association with the operating system 1120. Examples of the application programs include a phone dialer program, an electronic communication program (e.g., email program, instant message program), a triggering application program, a word processing program, a spreadsheet program, an Internet browser program, and so forth.

The system 1114 also includes a non-volatile storage area 1122 within the memory 1118. The non-volatile storage area 1122 may be used to store persistent information that should not be lost when the system 1114 is powered down.

The application programs 1116 may use and store information in the non-volatile storage area 1122, such as email, attachments or other messages used by an email application, and the like. A synchronization application (not shown) also resides on the system 1114 and is programmed to interact with a corresponding synchronization application resident on a host computer to keep the information stored on the non-volatile storage area 1122 synchronized with corresponding information stored at the host computer.

The system 1114 has a power supply 1124, which may be implemented as one or more batteries. The power supply 1124 may further include an external power source, such as an AC adapter or a powered docking cradle that supplements or recharges the batteries.

The system 1114 may also include a radio interface layer 1126 that performs the function of transmitting and receiving radio frequency communications. The radio interface layer 1126 facilitates wireless connectivity between the system 1114 and the "outside world," via a communications carrier or service provider. Transmissions to and from the radio interface layer 1126 are conducted under control of the operating system 1120. In other words, communications received by the radio interface layer 1126 may be disseminated to the application programs 1116 via the operating system 1120, and vice versa.

The visual indicator 1110 may be used to provide visual notifications, and/or an audio interface 1128 may be used for producing audible notifications via an audio transducer (e.g., audio transducer 1112 illustrated in FIG. 11A). In the illustrated embodiment, the visual indicator 1110 is a light emitting diode (LED) and the audio transducer 1112 may be a speaker. These devices may be directly coupled to the power supply 1124 so that when activated, they remain on for a duration dictated by the notification mechanism even though the processor 1130 and other components might shut down for conserving battery power. The LED may be programmed to remain on indefinitely until the user takes action to indicate the powered-on status of the device.

The audio interface 1128 is used to provide audible signals to and receive audible signals from the user (e.g., voice input such as described above). For example, in addition to being coupled to the audio transducer 1112, the audio interface 1128 may also be coupled to a microphone to receive audible input, such as to facilitate a telephone conversation.

The system 1114 may further include a video interface 1132 that enables an operation of peripheral device 1134 (e.g., on-board camera) to record still images, video stream, and the like.

A mobile electronic device 1100 implementing the system 1114 may have additional features or functionality. For example, the mobile electronic device 1100 may also include additional data storage devices (removable and/or non-removable) such as, magnetic disks, optical disks, or tape. Such additional storage is illustrated in FIG. 11B by the non-volatile storage area 1122.

Data/information generated or captured by the mobile electronic device 1100 and stored via the system 1114 may be stored locally on the mobile electronic device 1100, as described above, or the data may be stored on any number of storage media that may be accessed by the device via the radio interface layer 1126 or via a wired connection between the mobile electronic device 1100 and a separate electronic device associated with the mobile electronic device 1100, for example, a server-computing device in a distributed computing network, such as the Internet (e.g., server computing device 1114 in FIG. 11). As should be appreciated such data/information may be accessed via the mobile electronic device 1100 via the radio interface layer 1126 or via a distributed computing network. Similarly, such data/information may be readily transferred between electronic devices for storage and use according to well-known data/information transfer and storage means, including email and collaborative data/information sharing systems.

As should be appreciated, FIG. 11A and FIG. 11B are described for purposes of illustrating the present methods and systems and is not intended to limit the disclosure to a particular sequence of steps or a particular combination of hardware or software components.

FIG. 12 illustrates a block diagram of a distributed system in which aspects of the disclosure may be practiced. The system 1200 includes a general computing device 1202 (e.g., a desktop computer), a tablet computing device 1204, and/or a mobile computing device 1206. The general computing device 1202, the tablet computing device 1204, and the mobile computing device 1206 can each include the components, or be connected to the components, that are shown associated with the electronic device 1000 in FIG. 10 or the mobile electronic device 1100 in FIGS. 11A-11B.

The general computing device 1202, the tablet computing device 1204, and the mobile computing device 1206 are each configured to access one or more networks (represented by network 1208) to interact with the assistant application 1210 stored on one or more storage devices (represented by storage device 1212) and executed on one or more server computing devices (represented by server computing device 1214). In some aspects, the server computing device 1214 can access and/or receive various types of services, communications, documents and information transmitted from other sources, such as a web portal 1216, an electronic communications services 1218, directory services 1220, instant messaging and/or text services 1222, and/or social networking services 1224. In some instances, these sources may provide robust reporting, analytics, data compilation and/or storage service, etc., whereas other services may provide search engines or other access to data and information, images, graphics, videos, document processing and the like.

As should be appreciated, FIG. 11 is described for purposes of illustrating the present methods and systems and is not intended to limit the disclosure to a particular sequence of steps or a particular combination of hardware or software components.

Aspects of the present disclosure, for example, are described above with reference to block diagrams and/or operational illustrations of methods, systems, GUIs, and computer program products according to aspects of the disclosure. As discussed earlier, the operations noted in the blocks may occur out of the order as shown in any flowchart. For example, two blocks shown in succession may in fact be executed substantially concurrently or the blocks may sometimes be executed in the reverse order, depending upon the functionality/acts involved. Additionally, the functionality or elements shown in one GUI can be used in another GUI, and vice versa.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternative aspects falling within the spirit of the broader aspects of the general inventive concept embodied in this application that do not depart from the broader scope of the claimed disclosure.

What is claimed is:

1. A system comprising:

a processing device; and memory storing instructions that, when executed, perform operations comprising:

identifying, by a digital assistant, a topic in activity data, wherein the digital assistant is configured to monitor a conversation between users and detect topics used by the users in real-time;

determining information for the topic, wherein a type of the information is based on a type of the topic;

determining, by analyzing the activity data, a user having knowledge of the topic;

determining a candidate definition for the topic as known by the user based on an evaluation of the activity data, wherein the candidate definition at least one of defines a meaning of the topic or includes an acronym expansion of the topic;

determining, for the user, a confidence score for the candidate definition for the topic, wherein the confidence score indicates a confidence or a probability that the user knows the topic is associated with the candidate definition;

storing the topic, the information for the topic, the candidate definition for the topic, and the confidence score in a global list; and evaluating the candidate definition during a subsequent conversation to determine whether the topic is known to the user.

2. The system of claim 1, wherein the topic represents an acronym, a codename, or an abbreviation.

3. The system of claim 1, wherein the topic represents a tool, a team, or an organizational unit.

4. The system of claim 1, wherein the activity data is associated with multiple users in an enterprise, the user being a member of the enterprise.

5. The system of claim 1, wherein the activity data includes at least one of: an electronic communication, a document, a meeting, a task, or a project.

6. The system of claim 1, wherein the activity data includes at least one of: internet browser activity or a search history.

7. The system of claim 1, wherein the information includes a definition of the topic, a description of the topic, or people associated with the topic.

8. The system of claim 1, wherein determining the user having knowledge of the topic comprises:

determining whether the user has used the topic previously in the activity data; and when the user has used the topic previously in the activity data, determining the user has knowledge of the topic.

9. The system of claim 1, wherein determining the user having knowledge of the topic comprises:

determining whether the user has searched for or accessed information on the topic previously in the activity data; and when the user has searched for or accessed the information on the topic previously in the activity data, determining the user has knowledge of the topic.

10. The system of claim 1, wherein the confidence score indicates a probability that the user knows the topic is associated with the candidate definition.

11. The system of claim 1, wherein the confidence score is based on at least one of:

interactions the user has with the topic;

a frequency of the interactions; or a usage or referral of the topic by other users associated with the user.

12. The system of claim 1, wherein the global list comprises a plurality of topics and a plurality of candidate definitions that are associated with a plurality of users.

13. The system of claim 1, wherein the candidate definition is a definition as known by the user.

14. The system of claim 1, wherein the global list further stores one or more topics that are related to the topic based on the one or more topics being semantically or topically related to the topic.

15. A method comprising:

identifying, by a digital assistant, a topic in activity data, wherein the digital assistant is configured to monitor a conversation between users and detect topics used by the users in real-time;

determining information for the topic as known;

determining, by analyzing the activity data, a first user and a second user having knowledge of the topic;

determining, for the first user, a first confidence score for a first candidate definition for the topic as known by the first user, wherein the first confidence score indicates a confidence or a probability that the first user knows the topic is associated with the first candidate definition;

determining, for the second user, a second confidence score for a second candidate definition for the topic as known by the second user;

storing in a global list:

the topic;

the information for the topic;

the first candidate definition;

the second candidate definition;

the first confidence score; and the second confidence score; and evaluating the candidate definition during a subsequent conversation to determine whether the topic is known to the user.

16. The method of claim 15, wherein the activity data includes documents or communications of users belonging to an enterprise.

17. The method of claim 16, wherein analyzing the activity data comprises:

searching the documents or the communications of the users for uses of the topic and references to the topic; and determining the first user and the second user have knowledge of the topic based on at least one of their respective uses of the topic or their respective references to the topic.

18. The method of claim 15, the method further comprising:

determining, for the first user, a third confidence score for the second candidate definition for the topic as known by the first user; and further storing in the global list the third confidence score.

19. The method of claim 18, the method further comprising:

determining, for the second user, a fourth confidence score for the first candidate definition for the topic as known by the second user; and further storing in the global list the fourth confidence score.

20. A device comprising:

a processing device; and memory storing instructions that, when executed, perform operations comprising:

identifying, by a digital assistant, a topic in conversation data, wherein the digital assistant is configured to monitor a conversation between users and detect topics used by the users in real-time;

determining information for the topic;

determining, based on the conversation data, a user having knowledge of the topic;

determining a candidate definition for the topic as known by the user based on an evaluation of activity data associated with the user, wherein the candidate definition at least one of defines a meaning of the topic or includes an acronym expansion of the topic;

determining, based on the conversation data, a candidate definition for the topic as known by the user;

determining, for the user, a confidence score for the candidate definition;

storing the topic, the information for the topic, the candidate definition for the topic, and the confidence score in a global list; and evaluating the candidate definition during a subsequent conversation to determine whether the topic is known to the user.

* * * * *